Dec. 1, 1964   W. B. HERNDON ETAL   3,159,051
TRANSMISSION
Filed Aug. 8, 1958   7 Sheets-Sheet 1
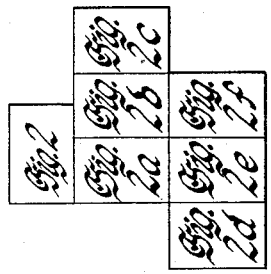
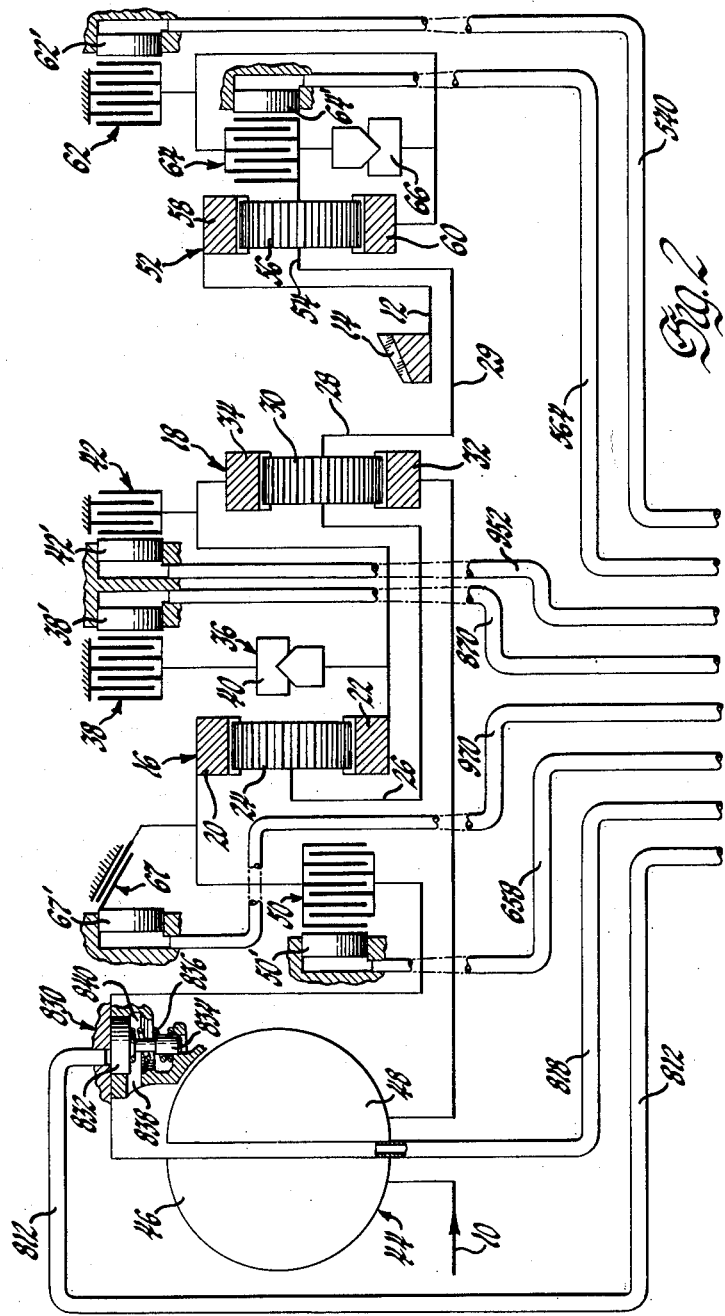
INVENTORS
Walter B. Herndon &
BY August H. Borman, Jr.
Heigh L. Fisher
ATTORNEY

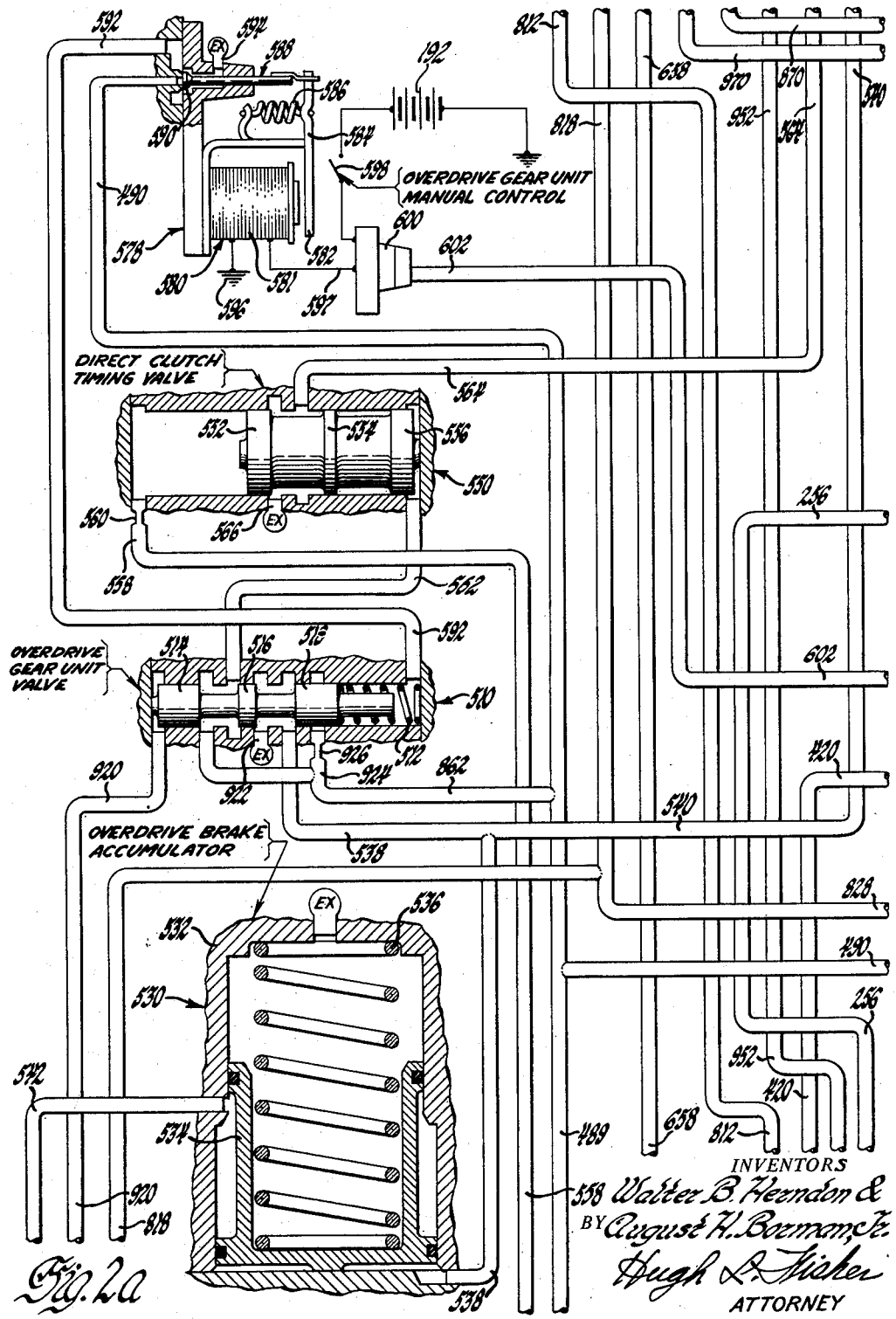

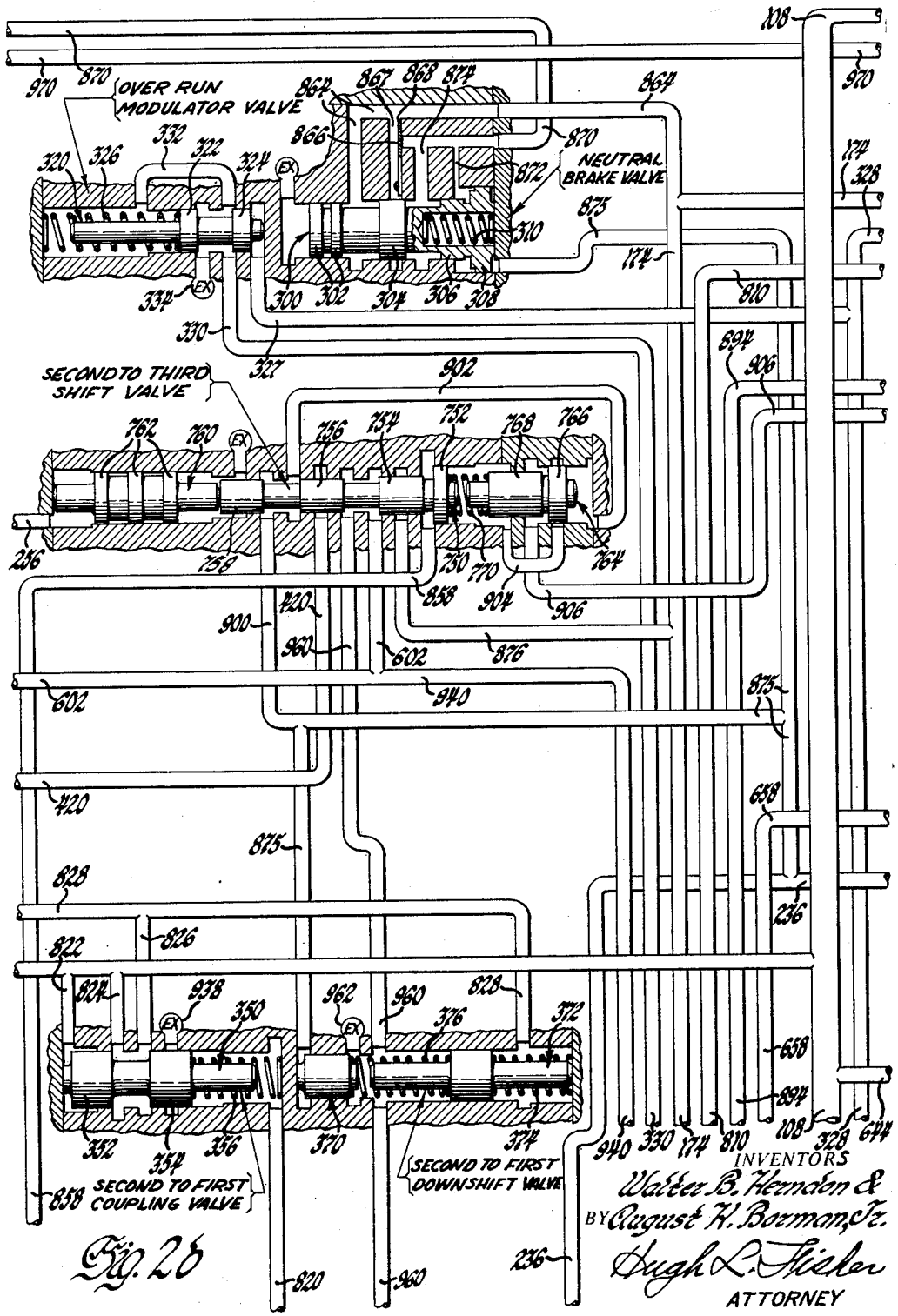

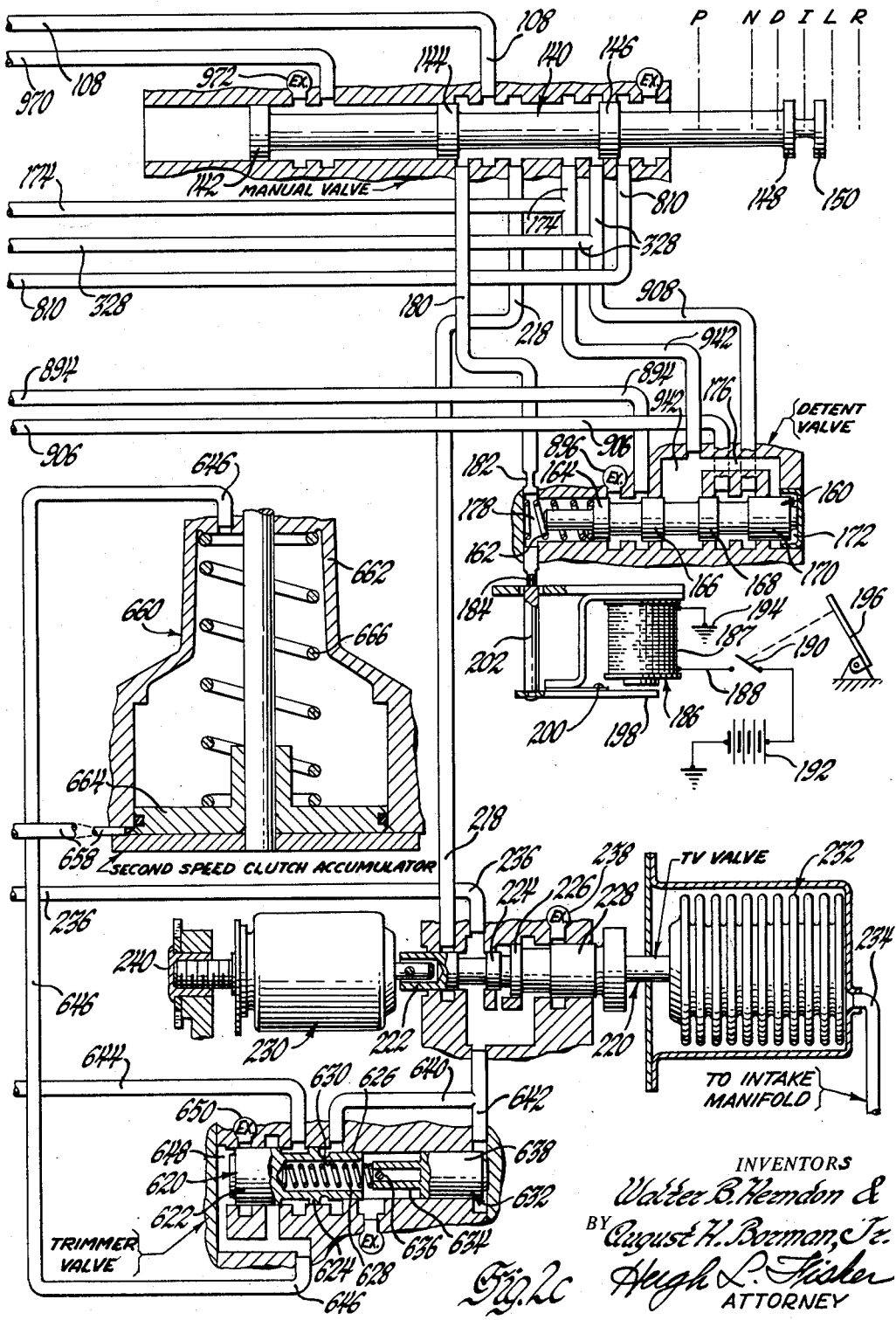

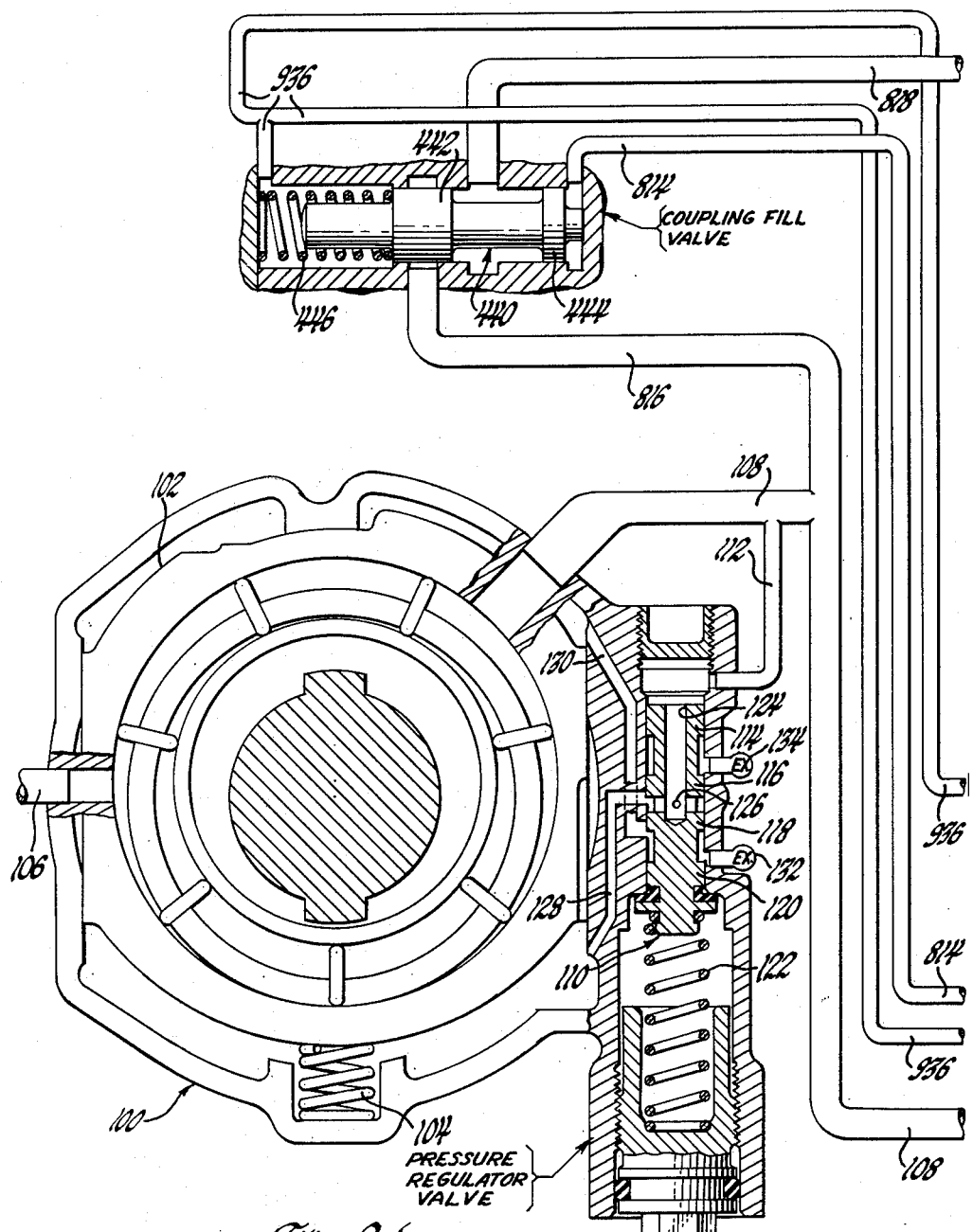

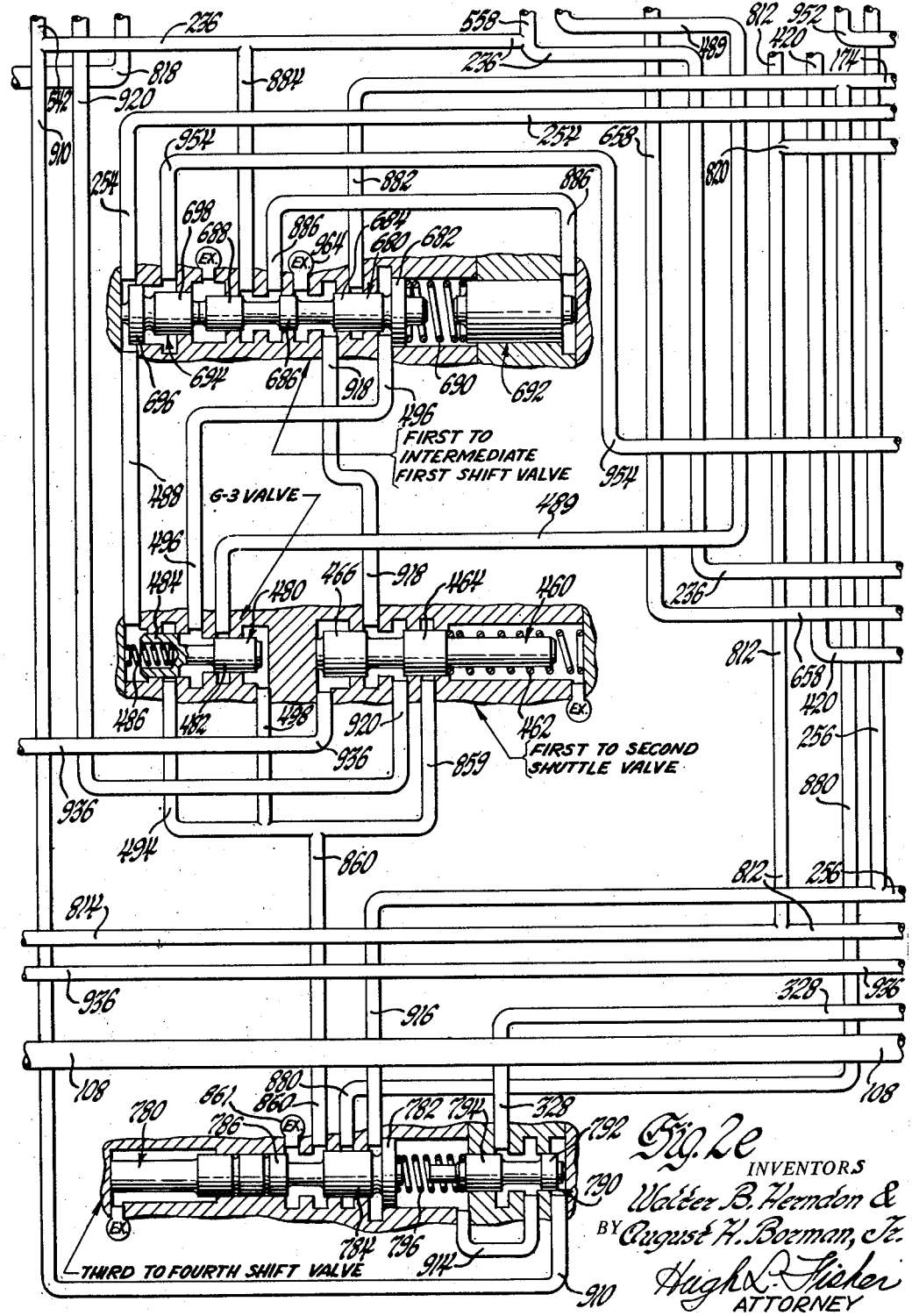

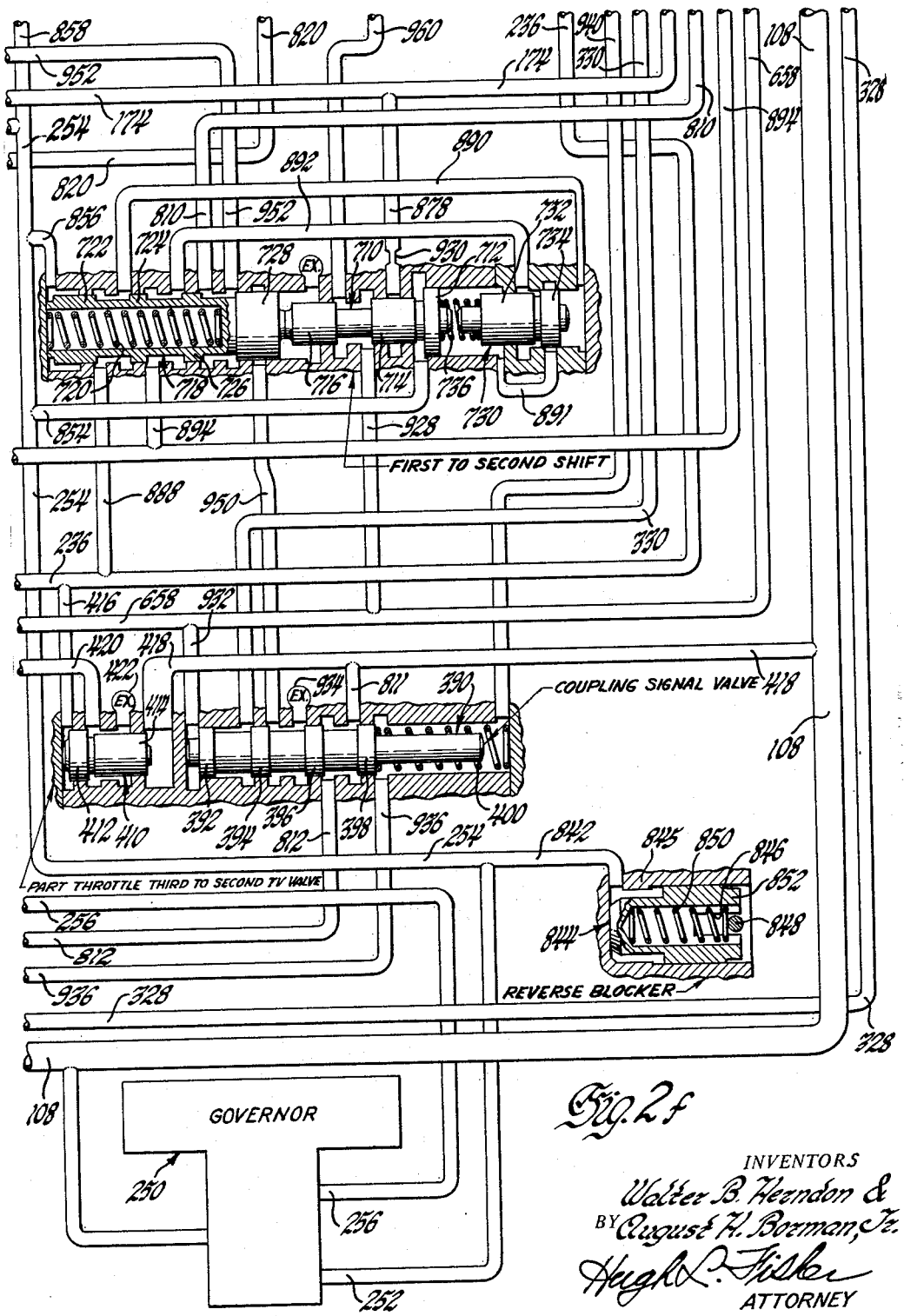

United States Patent Office 3,159,051
Patented Dec. 1, 1964

3,159,051
TRANSMISSION
Walter B. Herndon, Ann Arbor, and August H. Borman, Jr., Detroit, Mich., assignors to General Motors Corporation, Detroit, Mich., a corporation of Delaware
Filed Aug. 8, 1958, Ser. No. 754,089
38 Claims. (Cl. 74—645)

This invention relates to automatic transmissions, and particularly, to plural step ratio transmissions adapted, although not exclusively, for use with motor vehicles.

With the increased use of automatic transmissions, there is a need for a simple and compact transmission that meets the requirements of many varied applications. In the case of a motor vehicle, e.g., the transmission should be capable of installation, either next to the engine or the rear axle without requiring such excessive space that a large hump in the body floorline is needed. Moreover, when the particular application requires greater ratio coverage, the transmission should be easily combined, without a major reconstruction, with supplemental or auxiliary units. As for the simplicity, such should be obtainable without a compromise of performance and efficiency. For instance, because of the automatic aspect, a fluid start is essential, but this fluid drive requirement should not result in excessive fluid losses. Also, because of the excessive gear noises occurring with compounded gearing, it is preferable to avoid such but this presents a problem of obtaining adequate ratio coverage.

Accordingly, the invention contemplates the provision of a plural step ratio automatic transmission that is simplified and compact structurally, that may be easily rearranged for installation either near the engine or the rear axle without interfering with the intended functions and without consuming excessive space, and that may be combined conveniently and easily with auxiliary or supplementary ratio units to afford greater ratio coverage for different applications.

Moreover, the invention affords a transmission that utilizes planetary gear units advantageously to reduce the need for compounding thereby lessening gear noise and that affords a fluid start with the fluid losses being kept to a minimum.

In particular, the invention provides a basic 3-speed transmission of the foregoing character that may be joined with the auxiliary gear units to supplement the ratio coverage from the basic transmission.

To obtain the desired ratios without any complicated compounding of planetary gear units, it is desirable to have plural drive trains, each employing a single or a minimum of planetary gear units with the drive to each plural train being initiated by an appropriate torque transmitting device. Because of the fluid start requirement, one of these drive trains should desirably include a hydrodynamic torque transmitting device, e.g., a fluid coupling, effective to commence vehicle movement while the other drive trains may employ conventional frictional devices. Then, to reduce fluid losses as well as to change from one drive train to the other for the needed ratio coverage, it is often necessary to empty the fluid coupling and refill it when needed. This filling and emptying of the coupling offers a problem since different operating conditions require the emptying and filling to be at different rates for optimum performance.

It is, therefore, an objective of the invention to afford a transmission of the foregoing character provided with plural drive trains, one receiving torque through a hydrodynamic torque transmitting device and another through a friction device, with means for correlating the operation of each device so as to produce smooth transitions both to faster and slower speed drives under variable load conditions. Particularly, the invention furnishes novel means for filling and emptying the hydrodynamic torque transmitting device at variable rates determined by the torque load on the driving engine. During one transition, engine speed-up is controlled by varying the rate of fill thereby providing a smooth and gradual shift, regardless of operating conditions.

When auxiliary units are added to a basic transmission to supplement the ratio coverage, additional controls are needed whether these additional ratios are obtained manually or automatically. Consequently, a problem of integrating the additional supplemental controls with those for the basic transmission arises. Furthermore, the supplemental controls should be such that they may be manually rendered inoperative or disabled, when not desired.

Hence, an object of the invention is to furnish controls for an auxiliary unit to a basic transmission that may be integrated with the basic transmission controls without interfering with the function of either, that are suited both for automatic and manual control, and that may be manually rendered inoperative when their use is not required.

Another object of the invention is, with the above mentioned auxiliary unit controls, to afford means whereby a predetermined drive ratio must be attained before one aspect of control is possible. Specifically, a manually operated control device is provided that includes an electrical circuit which may be completed manually when a pressure switch is closed upon attainment of the predetermined drive ratio and an electric relay energized to actuate a valve element which, in turn, controls certain phases of operation of the auxiliary unit.

When planetary gearing is employed to obtain different drive ratios, as is well known, reaction necessary for certain of the ratios is obtained by holding one of the elements of the gearing against rotation in a particular direction. Because of their advantages, one-way devices, such as brakes, are commonly employed to prevent rotation in this direction. However, if drive is reversed, a one-way device disengages because of the inherent construction and the drive train is interrupted. This reverse drive condition exists in motor vehicles during coast and, as a result, the engine cannot be used for overrun braking unless provision is made therefor. Consequently, when overrun braking is needed, an overrun brake is employed to prevent the reaction element from rotating in either direction preserving the drive connection between the engine and the wheels. When several different drive ranges are obtainable, for instance, Low, Intermediate, and Drive, and overrun braking is desired in both the Low and Intermediate ranges, the braking torque is less in the Intermediate or higher speed range than in the Low Range. As a result, to obtain a smooth engagement of the overrun brake in both ranges, it is desirable to reduce the engaging pressure with the decreased torque requirements in Intermediate Range.

Accordingly, the invention provides a fluid actuated mechanism for preventing rotation of a planetary gear unit reaction element in either direction in selected drive ranges so as to furnish overrun braking. In one of these ranges when the overrun braking torque is reduced, the invention provides novel means for reducing the pressure of fluid supplied for actuating the mechanism. Specifically, with a particular drive range established by a suitable agency, such as a manual selector valve, a pressure reducing means becomes effective to reduce the pressure of the fluid supplied to the mechanism.

The foregoing and other objects and advantages of the invention will be apparent from the following description and from the accompanying drawings, in which:

FIGURE 1 illustrates how the various figures are combined to show the transmission control system in diagrammatic form;

FIGURE 2 demonstrates schematically one form of a transmission constructed according to the invention operated by the control system; and FIGURES 2a, 2b, 2c, 2d, 2e, and 2f show the various parts of the control system.

GENERAL DIAGRAMMATIC ARRANGEMENT

Referring to the drawings, and particularly FIGURE 2, the transmission, illustrated schematically, has a power shaft 10 drive connected to a power source, such as a vehicle engine (not shown), and a load shaft 12 drive connected to a drive gear 14 for the usual rear axle gearing (not shown). By the arrangement illustrated, the transmission is divided into main and auxiliary sections each being positioned on opposite sdes of the axle gearing. Other arrangements of the transmission are possible, as will be apparent to those skilled in the art, e.g., the two sections of the transmission may be combined and either mounted as a unit immediately back of the engine or closely adjacent to and on the same side of the axle gearing.

The main section, i.e., the portion of the transmission mounted forwardly of the axle gearing comprises a pair of planetary gear units 16 and 18 which are connected to provide three forward speeds and a reverse, as will become apparent. The front gear unit 16 has an input ring gear 20 and a reaction sun gear 22, both intermeshing with a series of planet pinions 24 revolvably supported on an output planet carrier 26. The output carrier 26 is connected to an output carrier 28 for rear gear unit 18 while the latter carrier 28 is, in turn, joined to an intermediate shaft 29 extending rearwardly therefrom. A number of planet pinions 30 are journaled on the rear unit output carrier 28 and intermesh both with an input sun gear 32 and a reaction ring gear 34 to complete gear unit 18. The reaction gears 22 and 34 for both of the front and rear gear units 16 and 18 are joined together and restrained from reverse rotation by the combined action of a one-way device 36 and a neutral brake 38 which holds the outer race 40 of the one-way device 36 in either direction. One-way device 36 may be of any known structure employing one-way elements, such as sprags, rollers, or the equivalent, and of the kind that is constructed and arranged to permit relative rotation between two revolvable members in one direction and to prevent relative rotation therebetween in an opposite direction. For reasons to be explained, an overrun brake 42 is included for restraining rotation of the front and rear unit reaction gears 22 and 34 in either direction at selected times when the braking benefits from the engine are wanted.

Drive from the power shaft 10 to the front and rear gear units 16 and 18 is transferred in different drive ratios, as will be explained, by a hydrodynamic torque transitting device, such as the fluid coupling, denoted generally at 44, which has an impeller 46 revolvable by the power shaft 10 and a turbine 48 revolvable with the input sun gear 32 for the rear gear unit 18, and/or by a second speed clutch 50 interposed between the power shaft 10 and the input ring gear 20 for the front gear unit 16.

In the auxiliary section of the transmission, an auxiliary or overdrive gear unit, shown generally at 52, is depicted of a character for producing either a direct drive or an overdrive. This overdrive gear unit 52 has an input planet carrier 54 which is revolvable with the intermediate shaft 29 and which rotatably supports a number of planet pinions 56 thereon. Pinions 56 intermesh with an output ring gear 58 drive connected to the load shaft 12 and a reaction sun gear 60 arranged to be held against rotation by an overdrive brake 62 for the overdrive. For direct drive a direct clutch 64 is interposed between the planet carrier 54 and the sun gear 60 and when engaged will lock up gear unit 52.

Assuming that the overdrive brake 62 has been disengaged, then to avoid a momentary interruption of drive between the intermediate shaft 29 and the load shaft 12 during the interval when the overdrive brake 62 is being disengaged and direct clutch 64 engaged, a one-way device 66 is interposed also between the carrier 54 and the sun gear 60. One-way device 66, which may be of a construction similar to the one-way device 36, is arranged to clutch the overdrive unit carrier 54 and the overdrive unit sun gear 60 together the instant the overdrive brake 62 permits the sun gear 60 to revolve forwardly at the speed of the carrier 54 and will not permit the sun gear 60 to go faster than the carrier 54.

OPERATION OF GENERAL ARRANGEMENT

The transmission as so far described affords a Neutral, at least six forward speeds and a Reverse as follows.

The Neutral no-drive status is attained by disengaging the neutral brake 38 so that neither the front gear unit 16 nor the rear gear unit 18 has reaction and drive cannot be transferred between the power and intermediate shafts 10 and 29. Direct clutch 64 is engaged and coupling 44 filled in preparation for first speed.

In first speed the coupling 44 is still operative and the neutral brake 38 is engaged, the direct clutch 64 having been engaged in neutral. Drive, then, is from the power shaft 10 through the coupling 44 to the input sun gear 32 for rear gear unit 18. Since the rear unit reaction ring gear 34 is prevented from revolving backwards by the one-way device 36 and the neutral brake 38, the rear unit carrier 28 will be revolved forwardly at a reduced speed determined by the proportion of tooth numbers on the gears 32 and 34. During this time the front gear unit 16 will be ineffective since the second speed clutch 50 is disengaged and the ring gear 20 will be overdriven relative to the carrier 26. Drive from the intermediate shaft 29 is then, with the direct clutch 64 engaged to lock up overdrive gear unit 52, transferred to the load shaft 12 at the ratio of the rear gear unit 18.

In what is preferably referred to as an intermediate first or one and one-half speed, for reasons which will become apparent, the ovedrive gear unit 52 is reconditioned by engaging overdrive brake 62 and disengaging the direct clutch 64, gear units 16 and 18 retaining their first speed status. Hence, the drive from the intermediate shaft 29 to the overdrive gear unit 52 will cause the reaction sun gear 60 to attempt to rotate forwardly, which is prevented by overdrive brake 62, and therefore, the output ring gear 58 and load shaft 12 will be driven at a faster speed than the intermediate shaft 29 and carrier 54. The drive ratio now is determined by the product of the ratios from the rear and overdrive gear units 18 and 52.

For second speed, the coupling 44 is drained, the second speed clutch 50 engaged, and the status of the overdrive gear unit 52 changed back to that existing in first speed with direct clutch 64 engaged and overdrive brake 62 disengaged. Drive is from the power shaft 10 through the second speed clutch 50 to the input sun gear 20 for the front gear unit 16. With the front unit reaction sun gear 22 prevented from rotating backwards by one-way device 36 and neutral brake 38, the front unit carrier 26 will be driven at a reduced speed, again determined by the number of teeth on the front unit ring and sun gears 20 and 22. From the front unit carrier 26, drive is transferred through the rear unit carrier 28, intermediate shaft 29, and through overdrive gear unit 52, now locked up by direct clutch 64, to load shaft 12 at the ratio of the front gear unit 16. Rear gear unit 18 is ineffective with the coupling 44 empty and rear unit sun gear 32 will be allowed to revolve forwardly unimpeded at a faster speed than the rear unit carrier 28.

Under certain conditions to be explained, an intermediate second speed can be obtained. In this speed the second speed status of the front and rear gear units 16 and 18 is retained and the overdrive gear unit 52 is reconditioned for the overdrive ratio. Thus, the overall ratio becomes the product of the second speed and overdrive ratios.

In the third speed, the coupling 44 is again filled, and the second speed clutch 50 and the direct clutch 64 are engaged. Hence, drive is transferred from the power shaft 10 through the second speed clutch 50 to the input ring gear 20 for the front gear unit 16 and through coupling 44 to the input sun gear 32 for the rear gear unit 18. Both of the gears 20 and 32 will be driven at approximately the same speed, the sun gear 32 being driven somewhat slower due to the inherent fluid losses in the coupling 44. Consequently, both the front and rear gear units 16 and 18 will be locked up for a substantially direct drive and the reaction gears 22 and 34 will be revolved forwardly without restraint from the one-way device 36. From the front and rear gear units 16 and 18, drive is transferred via intermediate shaft 29 through the locked up overdrive gear unit 52 to the load shaft 12 at this nearly one to one ratio.

Fourth speed may now be obtained simply by disengaging direct clutch 64 and engaging overdrive brake 62 so as to condition gear unit 52 for the overdrive ratio. This will be the ratio in fourth speed since the front and rear gear units 16 and 18 remain locked up by fluid coupling 44 and the second speed clutch 50.

To obtain Reverse, a reverse brake 67, depicted as being of the cone type, although any equivalent such as multiple disks or a band may be used, is engaged to prevent rotation of the ring gear 20 for the front gear unit 16. The fluid coupling 44 is operative as is the direct clutch 64 for the overdrive gear unit 52, while the other clutches and brakes are disengaged. Drive from the power shaft 10 will be through coupling 44 to the input sun gear 32 for rear gear unit 18. The rear unit ring gear 34 will be revolved backwards, since the neutral brake 38 is now disengaged, and carry therewith the front unit sun gear 22. As a consequence, this backward rotation of the front unit sun gear 22 will cause the front unit carrier 26, with the front unit ring gear 20 held by reverse brake 67, to revolve backwards at a reduced speed. The rear unit carrier 28 and intermediate shaft 29 will be rotated backwards, and since the overdrive gear unit 52 is locked up, the load shaft 12 will be driven in Reverse at the same speed as the front unit carrier 26.

From the foregoing explanation, it can be seen that the main section of the transmission offers three Forward speeds and a Reverse and, therefore, in some installations could be used separately from the auxiliary section, if desired. However, when additional ratios are desired, and particularly an overdrive ratio for economy purposes, then the overdrive gear unit 52 may be correlated therewith to afford the speed drives mentioned, namely, Intermediate First, Intermediate Second, and Fourth speeds.

CONTROL SYSTEM

The various aforementioned brakes and clutches, by appropriate servos and the fluid coupling 44, are all fluid operated in the proper sequence by the hydraulic control system depicted schematically in the drawings. The servos for each of the brakes and clutches have been assigned the same number as the brake or clutch it operates but with the addition of a prime ('). Each servo may be of known construction employing a piston which by fluid pressure supplied to the servo is moved to the operative position engaging the associated brake or clutch.

Pressure fluid for the system is supplied by a pump, designated generally in FIGURE 2d at 100, of the variable capacity kind similar in function and detail to that disclosed in the application of Walter B. Herndon, S.N. 444,119, refiled July 19, 1954, and entitled Variable Capacity Pressure Systems, now Patent No. 2,875,699 issued Mar. 3, 1959. Since this pump constitutes no part of the present invention, a detailed description thereof is not deemed necessary. Briefly, the pump 100 has a slide 102 movable up and down, as viewed, in a guideway in the pump body. The other components of the pump are so related to the slide 102 that the volume of fluid discharged by the pumps depends upon the position of the slide 102 in the body. A spring 104 biases the slide 102 to the uppermost position which corresponds to the maximum capacity position, i.e., in this position a maximum volume of fluid is discharged by the pump 100. Preferably, the pump 100 is revolvable by the power shaft 10 so to commence operation as soon as the vehicle engine is started. Fluid, then, is drawn from a sump (not shown) through a suction line 106 and discharged into a main supply line 108.

Pressure Regulator Valve

For contrloling the pressure of the fluid discharged by the pump 100 into the main supply line 108, a pressure regulating valve, indicated generally at 110, is employed. The pressure regulator valve 110 is slidable within a bore in a valve body and is furnished with pressure fluid by the main supply line 108 through the branch 112 thereof. The valve 110 includes a number of spaced valve lands 114, 116, 118 and 120, and is biased upwardly towards the maximum pressure position by a spring 122 against the pressure of the fluid delivered by branch 112 to the top end of the valve 110. A passage 124 extends from the upper end of the valve 110 through the center thereof and communicates with a cross passage 126 in the valve between the lands 116 and 118. In the position of the valve 110 demonstrated, pressure fluid from the branch 112, acting on the upper face of the valve to urge it downwardly against spring 122, will be transferred by passages 124 and 126 to a bottom slide supply line 128 which communicates with the bottom of the slide 102. Also, a top slide supply line 130 extending to the top of the slide 102 communicates through valve lands 118 and 120 with an exhaust port 132. Hence, the pressure fluid along the bottom of the slide 102 will, along with the spring 104, urge the slide 102 upwardly towards the maximum capacity position. As the fluid pressure in the branch 112 increases the valve 110 will move downwardly, aligning lands 114 and 116 so as to connect the bottom slide supply line 128 with an exhaust port 134 and lands 116 and 118 so as to furnish the top slide supply line 130 with fluid pressure via valve passages 124 and 126. Then, the pressure acting on the top of the slide 102 will urge it downwardly and reduce the volume of the pump output.

In the foregoing manner, the pressure regulator valve 110 will, during operation, reciprocate between these two positions so as to supply fluid pressure either via line 130 to the top of the slide 102 or via line 128 to the bottom of the slide 102. Consequently, the slide 102 will be positioned so that the volume of fluid pumped is sufficient to produce the output pressure determined by the pressure regulator spring 122. This regulating action by the valve 110 is continuous and will maintain the output pressure within the main supply line 108 relatively constant at the selected value which may, for purposes of demonstration, be 100 p.s.i.

Manual Valve

The main supply line 108 extends to a manual valve, designated generally in FIGURE 2c at 140, which is slidable within a bore in the valve body and includes apaced lands 142, 144 and 146. At the extreme right end of the valve 140, a pair of spaced flanges 148 and 150 are formed for receiving a fork, or other suitable agency, which, through an appropriate mechanism, is rendered accessible to the driver so that the manual valve 140 may be moved axially thereby to the lines marked with the legends Park, Neutral, Drive, Intermediate, Low and Reverse. These legends correspond to the various transmission settings obtainable with the control system.

Detent Valve

Positioned below the manual valve 140 in FIGURE 2c is a detent valve, denoted generally at 160 which is slidable in another bore in the valve body and which is urged to the depicted upshifted position by a spring 162. A series of lands 164, 166, 168 and 170 on the detent valve 160 control varies ports connected to lines, which will be identified later. At the end of the valve 160 opposite spring 162 a control chamber 172 is provided and is supplied with pressure fluid by a Drive Range supply line 174 from the manual valve 140 and a branch 176 thereof. This pressure fluid within the control chamber 172 acting on the face of the land 170 urges the detent valve 160 to the left and to the downshifted position. The other end of the detent valve 160, or the spring end, is afforded with another control chamber 178 which is supplied pressure fluid by a feed line 180 from the manual valve 140. An orifice 182 in the line 180 controls the inlet to the chamber 178, while an orifice 184 of larger area than orifice 182 controls the outlet from the chamber 178.

Exhaust of fluid from the control chamber 178 via orifice 184 is controlled by a relay 186 having an energizing coil 187 connected by a conductor 188 and a switch 190 to a voltage source, such as the vehicle battery 192, and grounded at 194. Since the detent valve 160 functions to produce a forced downshift, the switch 190 controlling the energization of the relay 186 is preferably operated by an accelerator pedal 196 and is arranged to be closed thereby when the accelerator pedal 196 is depressed a predetermined amount. When the relay 186 is energized in this manner, an armature 198 therefor is caused to rotate counterclockwise about pivot point 200 and move a valve stem 202 attached thereto downwardly. Since the valve stem 202, in the illustrated position, closes the orifice 184, moving it downwardly will open the orifice 184 to exhaust and drain the control chamber 178. The force from the pressure in the control chamber 172 is greater than the opposing force from the spring 162, and, therefore, the detent valve 160 will be shifted to the left and the downshifted position. By having the orifice 182 of smaller area than the orifice 184, the control chamber 178 may be exhausted without noticeably affecting the pressure from line 180. Otherwise, if the orifice 182 was larger than the orifice 184, the pressure in the control chamber 178 could conceivably approximate main line pressure or 100 p.s.i., even though the valve stem 202 was in the downward or exhaust position.

TV Valve

A feed line 218 extends from the manual valve 140 to another valve body bore in which is slidable a control or, as it will be referred to hereinafter, a TV valve, illustrated generally in FIGURE 2c at 220. The TV valve 220 is similar in function and structure to that disclosed in an application of Howard E. Olsen, S.N. 674,655, filed July 29, 1957, entitled Transmission, now Patent No. 3,077,122 issued February 12, 1963 and is not a part of the present invention. However, sufficient description will be given so as to understand its relationship with the control system. The TV valve 220 has a series of spaced lands 222, 224, 226 and 228 with lands 222 and 224 of the same diameter and lands 226 and 228 also of the same but a larger diameter than lands 222 and 224. Expansible and contractible chambers in the form of bellows are joined to each end of the TV valve 220, e.g., an atmospheric pressure operated bellows 230 is attached to the left end of the valve 220 and an intake manifold pressure operated bellows 232 is connected to the right end. Both of these bellows, 230 and 232, are of the character that have a spring within the corrugations thereof tending to expand them. Bellows 232 communicate with the engine intake manifold (not shown) through a conduit 234 whereas bellows 230 is evacuated and sealed from the atmosphere.

With this arrangement the TV valve 220 will develop a control or TV pressure which is reflective of both the torque load on the engine and changes in atmospheric pressure. As is well known to those versed in the art, with the engine idling the vacuum developed in the intake manifold is a maximum negative pressure and, therefore, for purposes of this explanation, will be referred to as a maximum manifold pressure. When manifold pressure is maximum, the bellows 232 will be contracted and move the TV valve 220 to the right. On the other hand, with a full load on the engine, the vacuum in the manifold becomes less negative and will be called a minimum manifold pressure. Hence, the manifold pressure is at a minimum and the bellows 232 will be permitted to expand and shift the TV valve 220 to the left.

The TV valve 220 regulates pressure in a conventional manner and this operation can be described more easily by assuming that a constant bias is being exerted by the bellows 232, urging the TV valve 220 to the left. Assuming further, that this leftward bias is sufficient to cause the valve land 222 to open the port connected to the feed line 218, pressure fluid will be then transferred to the opposite sides of the valve land 226 where the net effect will be to urge the TV valve 220 to the right until exhaust port 238 is uncovered by land 228, reducing the pressure. With a constant leftward bias the TV valve 220 will continuously reciprocate in the foregoing manner and supply a regulated control pressure or TV pressure to a line 236, the amount of this pressure being determined by the bias effect.

Although the extremes, i.e., maximum and minimum, for the TV pressure may be anything desired, for demonstration purposes, it will be assumed that with the engine idling and a maximum manifold pressure that the resultant rightward bias on the TV valve 220 is sufficient to cause land 222 to close the port to feed line 218 and open exhaust passage 238 so that the TV pressure will be zero. With a minimum manifold pressure, as that occurring with a full torque load on the engine, the leftward bias on the TV valve 220 will be greatest and the TV valve 220 will open the port connected to feed line 218 sufficiently to upset the regulation of the valve 220 and cause TV pressure in the line 236 to be the same as that in the supply line 218. In between these maximum and minimum extremes of TV pressure, the TV valve 220 will regulate in the described conventional manner.

The function of the bellows 230 is to provide a compensation in the TV pressure for changes in atmospheric conditions. Atmospheric pressure acts on the external area of the bellows 230 and when it decreases, as that occurring with an increase in altitude, the bellows will expand and urge the TV valve 220 to the right and to a decreased pressure position. Conversely, upon an increase in atmospheric pressure the bellows 230 will be compressed and urge the valve to the left increasing the TV pressure. An adjustment for the bellows 230 is afforded by an adjusting nut 240 threaded to an end of the bellows.

In correlating the effect of the bellows 230 to the engine, it should be kept in mind, that as a general rule, the volumetric efficiency of an internal combustion engine decreases with a decrease in atmospheric pressure, and consequently, the available engine torque at any given engine r.p.m. Hence, for smooth transitions from one speed ratio to another, a lesser TV pressure is desired with the lower torque output. Because the decrease in engine torque reflected by the manifold pressure is not the same rate as the decrease or change in atmospheric pressure, the two bellows 230 and 232 together develop a TV pressure that is a compromise of the two. As will be understood from the following description, TV pressure so developed is utilized with governor pressures to establish shift points for the transmission. Without such a compensation for engine torque decreases, shifts would tend to occur at the same point despite a reduction in available torque and would become rougher than when made at the peak torque speeds for the engine. In other words, the governor pressures and their relationship to a particular shift valve are intended, assuming full torque conditions, to produce shifts at a certain vehicle speed and corresponding torque. If the vehicle has gone to a higher altitude or atmospheric conditions at a particular altitude have changed so as to reduce available engine torque, manifold pressure will decrease slightly and accordingly, TV pressure. As a consequence the particular shift will occur sooner with this reduced TV pressure producing a smoother transition.

Governor

A suitable hydraulically operated governor, designated generally in FIGURE 2f at 250, is arranged to be driven at speeds proportional to those of the vehicle, and hence, is preferably revolved through an appropriate mechanism (not shown) by the load shaft 12. The governor 250 may be of the type disclosed in the application to Borman et al., S.N. 477,832, filed December 27, 1954, entitled Controlled Coupling Automatic Transmissions, now Patent No. 3,048,055 issued August 7, 1962, and since it is not a part of the invention, it is believed sufficient for descriptive purposes to explain that a branch 252 of the main supply line 108 supplies pressure fluid thereto. The governor 250, then, develops two stages of pressure determined by the speed at which the governor is revolved. At low speeds, a pressure is developed thereby, hereinafter referred to as G-1 pressure and is supplied to the line 254. Simultaneously a second governor pressure, designated G-2 pressure, is produced but at a different rate and transferred to the control system by a line 256. Both of these G-1 and G-2 pressures, of course, vary with the vehicle speed.

Neutral Brake Valve

The numeral 300 in the upper part of FIGURE 2b denotes a neutral brake valve which is slidable within a stepped bore within the valve body. Neutral brake valve 300 has a series of spaced lands 302, 304, 306 and 308, and is biased from the illustrated position by a spring 310. The function of this valve and its relationship to the various ports and lines controlled thereby will be described in the operational summary.

Overrun Modulator Valve

To the left of the neutral brake valve 300 and also shown by FIGURE 2b, an overrun modulator valve 320 is slidably positioned within another bore in the valve body and includes spaced lands 322 and 324. A spring 326 biases the valve 320 to the viewed position.

The overrun modulator valve 320 performs as a pressure regulating valve and is supplied pressure fluid by a branch 327 of an Intermediate Range supply line 328 extending from the manual valve 140. This pressure fluid which has the same pressure as main line or pump output pressure acts on the end face of the valve 320 adjacent land 324 and forces the valve to the left against the opposing bias from spring 326 until the port connected to an outlet line 330 is opened by land 324. The port for outlet line 330 is also connected to a line 332 extending to the spring end of the valve 320 and this pressure fluid assists the spring 326 in returning the valve 320 to a position in which the supply to lines 330 and 332 is cut off by land 324 and the pressure fluid in lines 332 and 330 is drained through an exhaust port 334, thus reducing the pressure sufficiently for the valve 320 to again open. This cycle continues with the overrun modulator valve 320 reciprocating between the open and closed positions to supply to line 330 a pressure that has a value somewhat less than that in the supply line 328. The reason for this reduced pressure in line 330 will be explained during the description of the system's operation.

Second to First Coupling Valve

A second to first coupling valve, viewed generally at the bottom of FIGURE 2b at 350, is slidable within a valve body bore and comprises spaced lands 352 and 354. The coupling valve 350 is urged to the position demonstrated by a spring 356 and controls the ports in the bore and the connected lines in a manner to be explained.

Second to First Downshift Valve

Next to the second to first coupling valve 350 in FIGURE 2b, a second to first downshift valve, designated generally at 370, is slidably positioned in one end of a bore in the valve body. Slidable in the same bore and of a larger diameter is a valve member 372 which is urged to the left by a spring 374 and to the right by a spring 376, the latter spring 376 being interposed between the downshift valve 370 and valve member 372. The function of this second to first downshift valve will likewise be explained in the operational summary.

Coupling Signal Valve

A coupling signal valve, assigned the numeral 390 and viewed in the middle of FIGURE 2f, reciprocates in another one of the valve body bores and has formed thereon spaced lands 392, 394, 396 and 398. These lands control various ports and lines connected thereto, as will be explained. A spring 400 urges the coupling signal valve 390 to the position shown.

Part Throttle Third to Second TV Valve

To the left of the coupling signal valve 390, a bore in the valve body receives a part throttle third to second TV valve 410 which reciprocates therein. Valve 410 has spaced lands 412 and 414, the land 414 being smaller in diameter than the land 412. The right end of the valve 410 has pump pressure acting thereon derived from a branch 418 of the main supply line 108, while the left end has TV pressure acting thereon which is supplied by a branch 416 of the TV pressure supply line 236. With the valve 410 in the position shown, an outlet line 420 therefrom is opened to an exhaust port 422, but when the TV pressure in branched line 416 attains a selected value, e.g., 70 p.s.i., and with a 100 p.s.i. pressure in line 418, the valve 410 will shift to the right until the land 412 cuts off the exhaust port 422 and opens line 420 to line 416. The pressure in the line 420, then, will be the same as that in line 416 until this communication is interrupted when the pump pressure in branch line 418 again dominates and the valve 410 recloses. The pressure in the line 420 is instrumetal in achieving a part throttle downshift, as will be explained in the operational summary.

Coupling Fill Valve

Near and above the pressure regulator valve 110 in FIGURE 2d of the control system diagram, a coupling fill valve, designated generally at 440, is disposed for slidable movement with another valve body bore. The coupling fill valve 440 has two spaced lands 442 and 444 and is urged to the right by a spring 446. The relationship of this valve 440 with the control system will be covered during the description of the sequential operation of the transmission.

First to Second Shuttle Valve

A first to second shuttle valve 460, slidable in a bore in the valve body, is biased to the depicted position by a spring 462 (see FIGURE 2e). Spaced lands 464 and 466, on the valve, control ports and the lines joined thereto in a manner, and for the purposes, to be described.

G-3 Valve

To the left and adjacent the first to second shuttle valve 460, a G-3 valve, denoted generally at 480 in FIGURE 2e, is slidably situated within a bore in a valve body. The G-3 valve 480 is of a spool character with spaced lands 482 and 484 and is biased to the right by a spring 486. G–1 pressure provided by a branch line 488 of the G–1 pressure supply line 254 acts on the spring end of the G–3 valve 480, urging this valve to the right so that land 482 will open a port connected to a line 489 communicating with a branch 490 from the main supply line 108. Pump pressure, then, is allowed into the space between the lands 482 and 484 and because of the differential areas, the land 484 being of larger diameter than the land 482, the valve 480 will be shifted back to the left. Land 482 will cut off the port connected to line 489 and land 484 will open the port joined to a line 494 which, when the G–3 valve is regulating, is open to exhaust and hence, the pressure being delivered to an outlet line 496 is reduced until at a level which will permit the valve 460 to again open the line 489. This regulation will continue and the pressure delivered to the line 496 will be a selected amount greater than G–1 pressure but less than the pump pressure in line 489.

It should be noted that in the absence of G–1 pressure in branch line 488 the G–3 valve 480 will regulate at a pressure determined entirely by the load of the spring 486. Also, when the line 494 is no longer connected to exhaust but is supplied with pressure, which it will be during selected intervals of operation, this pressure will be transferred through a communicating line 498 to the right end of the valve 480 and interrupt the regulation thereof. This aspect of operation, as well as the relationship of the G–3 valve 480 to the system, will be more completely described in the operational summary.

Overdrive Gear Unit Valve

An overdrive gear unit valve 510 slidable in another bore in the valve body is urged to the depicted position in FIGURE 2a by a spring 512. A series of spaced lands 514, 516 and 518 are formed thereon and cooperate with ports in the bore and connected lines, as will be explained. In its operation the overdrive gear unit valve 510 functions somewhat like a relay valve, thereby controlling the overdrive gear unit 52, as will be apparent.

Overdrive Brake Accumulator

An overdrive brake accumulator having the numeral 530 is positioned in FIGURE 2a near and below the overdrive gear unit valve 510 and comprises a stepped bore body 532 in which an accumulator piston 534 is installed for slidable movement. A spring 536 biases the accumulator piston 534 to the uncharged position depicted. The accumulator body 532 in the vicinity of the face of the piston 534 is connected to a branch 538 of a line 540 which interconnects the overdrive gear unit valve 510 and the overdrive brake servo 62'. The accumulator piston 534 is also exposed to TV pressure supplied by a branch 542 of the TV pressure supply line 236. Hence, this TV pressure, because of the differential areas of the piston 534 on which it acts, will combine with a spring 536 and urge the accumulator downwardly against the opposing force from the pressure fluid in the branch 538.

The function of overdrive brake accumulator 530 is to time the engagement and disengagement of the overdrive brake 62 in conjunction with the load on the engine represented by the TV pressure. To explain further, assume, initially, that TV pressure has some fixed value and that the overdrive brake 62 is being engaged, pressure fluid in the branch 538 will move into the accumulator body 532 and force the piston 534 upwardly until a predetermined volume of fluid exists within the accumulator 530 determined by the proportions of the accumulator and the pressures acting thereon. The effect on the overdrive brake 62 is to cause a gradual engagement since the accumulator 530 will cause a pressure drop in the supply line 540 thereto until the pressure in line 540 is able to build up enough to offset this reduction. If now, it is assumed that a full load exists on the engine, as during a full throttle shift, TV pressure will be a maximum and resist the movement of the accumulator piston 534. Then, since the pressure drop in line 540 will be considerably less, the overdrive brake 62 will engage quicker. It can be seen that with a heavy load on the engine the overdrive brake 62 is engaged quickly so as to not permit any lengthy interruption in the drive train, whereas with a light load the engagement of the overdrive brake 62 is retarded to give a smooth shift.

During disengagement, the accumulator 530, which has been allowed to fill or be charged, will empty quicker with a high TV pressure. The accumulator 530 then continues supplying pressure fluid to the overdrive brake servo 62' for an instant, thus slowing up the disengagement of the overdrive brake 62.

Direct Clutch Timing Valve

In the control diagram a direct clutch timing valve 550 is shown just above the overdrive gear unit valve 510 in FIGURE 2a and is slidably positioned within another bore in the valve body. The direct clutch timing valve 550 is of a relatively large diameter with three spaced lands 552, 554 and 556 and is intended to control the operation of the direct clutch 64 by producing an accumulator effect, the amount of which is determined by the torque demand on the engine. To accomplish this, a branch 558 of the TV pressure supply line 236 is connected to the left end of the valve 550 and has therein an orifice 560 which produces a time delay by momentarily reducing incoming TV pressure so that a complete engagement of the direct clutch 64 occurs after the one-way device 66 has become effective, particularly with reduced throttle openings. The opposite end of the timing valve 550 is connected by a line 562 to the overdrive gear unit valve 510, and when this latter valve 510 is properly positioned, pump pressure will be transferred by the line 562 to valve 550. The pressure fluid supplied by line 562 will shift the valve 550 to the left from the demonstrated position in which the lands 552 and 554 open a port connected to a fluid supply line 564 for the direct clutch servo 64' to an exhaust port 566. In this demonstrated position, the servo 64' is exhausted, and therefore, the direct clutch 64 is disengaged.

Movement of the direct clutch timing valve 550 to the left is opposed by TV pressure, and consequently, if the TV pressure is maximum, as with a full torque load, the progress of the valve 550 to the left is slower than when TV pressure is slight, as reflected by a small torque load on the engine. When TV pressure is a minimum, as with a zero throttle opening, the valve 550 will quickly supply fluid pressure to the direct clutch servo 64' so that the direct clutch 64 will be engaged for two-way drive, thereby affording an overrun braking connection through the overdrive gear unit 52. Moreover, during this movement, it is necessary for TV pressure fluid in the left end of the bore to be forced therefrom, and the orifice 560 will again function tending, when fluid is flowing in this direction, to impede the exhaust of the TV pressure fluid, thereby increasing the control stability of the valve 550. When the land 556 on the valve 550 uncovers the port connected to line 564, pressure fluid, then, will be supplied to the direct clutch servo 64' and effect an engagement of the direct clutch 64.

From the foregoing and as will be more apparent from the operational summary, the rate of engagement of the direct clutch 64 will be determined by the amount of TV pressure. A high TV pressure occurring with an increased engine torque load will delay the engagement of the direct clutch 64 insuring that the overdrive brake 62 has been disengaged. The control of the disengagement of the direct clutch 64 is likewise timed by TV pressure since a disengagement is initiated when the pressure fluid supply from line 562 is cut off by the overdrive unit valve 510. Hence, the timing valve 550 will be returned to the downshifted position illustrated quicker with a higher TV pressure.

Overdrive Gear Unit Manual Control

Associated with the overdrive gear unit relay valve 510, and positioned immediately above in FIGURE 2a, is an overdrive gear unit manual control device, denoted generally at 578. The device includes an overdrive gear unit relay 580 which has an energizing winding 581 and an armature 582 pivotally mounted at 584 and biased to the de-energized position viewed by a spring 586. As with the detent relay 186, a valve element 588 formed with a tapered head portion 590, is attached to the end of the armature 582. In the illustrated position, the head 590 interrupts communication between branch 490 of the main supply line 108 and a line 592 which extends to the spring end of the overdrive gear unit valve 510. When interrupting this communication between branch 490 and line 592, line 592 is drained around valve element 588 through an exhaust opening 594. The relay 580, which is grounded at 596, is connected by a conductor 597 to a source of voltage which may be the vehicle battery 192. The conductor 597 includes a manual switch 598 accessible to the driver and a pressure switch 600 of conventional structure which is connected by a line 602 to the control system. When pressure fluid of a predetermined value exists in the line 602, the pressure switch 600 will close, and assuming that the manual switch 598 also is closed, the circuit extending from the battery 192 to the overdrive gear unit relay 580 is completed causing the relay 580 to be energized. When so energized, the armature 582 will be drawn down shifting the valve element 588 so that the head 590 closes the exhaust opening 594 and permits communication beween branch 490 and line 592. The relationship of this control device 578 to the system will be apparent from the operational summary.

Trimmer Valve

Below the TV valve 220 in FIGURE 2c, a trimmer valve 620 is positioned so as to reciprocate within a bore in the valve body. Trimmer valve 620 comprises spaced lands 622, 624 and 626 and a central bore 630 in the right end thereof. A spring 628 is positioned within this bore 630 and abuts an end of a trimmer valve plug 632 stationed within the same trimmer valve bore. Trimmer valve plug 632 has a relatively small land 634 which is slidable within bore 630 of the trimmer valve 620 and is slotted to receive a cross pin 636 which limits the leftward travel of the plug 632. The larger diameter land 638 of the trimmer valve plug 632 is the same as that of land 626 on the trimmer valve 620, while the trimmer valve lands 622 and 624 are of somewhat larger diameter. A pair of branch lines 640 and 642 extend from the TV valve 220 and are in communication with the TV pressure supply line 236. Line 640 is connected to a port controlled by trimmer valve lands 624 and 626, while line 642 communicates with the right end of the trimmer valve plug 632. A branch 644 of the main supply line 108 extends to a port which is controlled by trimmer valve lands 622 and 624.

With this structure, the trimmer valve 620 will operate to regulate line pressure in line 644 in accordance with TV pressure and deliver what may be called a modulated TV pressure to a line 646. In regulating in the usual manner, the trimmer valve land 622 reciprocates between a position in which pressure fluid in line 644 is transferred to a port connected to line 646 and a position in which modulated TV pressure in line 646 is drained through an extension 648 of line 646 past land 622 and out exhaust port 650.

Second Speed Clutch Accumulator

The modulated TV pressure developed by the trimmer valve 620 is transferred by line 646 to a second speed clutch accumulator, shown at 660 in FIGURE 2c. This accumulator 660 comprises an accumulator body 662, an accumulator piston 664 slidable within a bore in the body 662, and a spring 666, which urges the accumulator piston 664 to the illustrated position. The bottom face of the accumulator piston 664 is connected to a line 658 which extends to the second speed clutch servo 50'.

The second speed clutch accumulator 660 operates somewhat in the manner of the overdrive brake accumulator 530 in that it controls the engagement of the second speed clutch 50 in accordance with the torque load on the engine reflected by variations in the modulated TV pressure. With a relatively slight modulated TV pressure existing with light engine loads, pressure fluid in the line 658 will shift the accumulator piston 664 upwardly and fill the resultant space. This accumulation effect will decrease the pressure in the line 658 so that the pressure must build up to that required for a complete and full clutch engagement affording an interval during which the second speed clutch 50 will be gradually engaged in a smooth and relatively imperceptible manner. If the torque demand on the engine is increased, modulated TV pressure will increase, and hence, the distance which the piston 664 is displaced is lessened since the bias of the spring 666 is assisted by the modulated TV pressure. With these conditions the drop in pressure from the accumulation effect is less. Desirably, then, the second speed clutch 50 will have a quicker engagement to compensate for an increase in the torque load.

First to Intermediate First Shift Valve

A first to intermediate first shift valve train is disposed for sliding movement within a stepped bore in the valve body and comprises the shift valve proper, designated in FIGURE 2e at 680, which is provided with a large land 682, an intermediate diameter land 684 and two smaller equal diameter lands 686 and 688. A spring 690 is interposed between the large diameter land end of the valve 680 and a plug valve 692 and functions to urge these valves 680 and 692 apart. Included in the first to intermediate first shift valve train and positioned adjacent the land 688 is a governor plug valve 694 formed with a large diameter land 696 and a smaller land 698. The ports in the bore of this valve and the lines to which they are connected will be identified along with their relationship to the system in the operational summary.

First to Second Shift Valve

Another stepped bore in the valve body slidably houses the first to second shift valve train with the first to second shift valve proper being denoted at 710 in FIGURE 2f. The valve 710 is provided with a large diameter land 712, an intermediate diameter land 714, and a somewhat smaller land 716. Next to the small diameter end of the shift valve 710, a governor plug valve 718 is slidably positioned and is urged into engagement therewith by a spring 720. A series of spaced lands 722, 724, 726 and 728 are formed on the governor plug valve 718. Completing the valve train is a regulator plug valve 730 mounted on the opposite side of the first to second shift valve 710 from plug valve 718. This plug valve 730 has small and large diameter lands 732 and 734 and is biased to the right by a spring 736 which is interposed between the large diameter land end of the shift valve 710 and the small diameter land end of plug valve 730. The porting for this valve train will be identified in the description of the control system operation.

Second to Third Shift Valve

Located in FIGURE 2b the first to second shift valve train and positioned within a stepped bore in the valve body for sliding movement therein is the second to third shift valve train. This train comprises a main shift valve 750 furnished with a large land 752, an intermediate diameter land 754 and two smaller diameter lands 756 and 758. Also constituting a part of this train and positioned to the left of the shift valve 750 is a governor plug valve 760 which is afforded an interrupted land 762. Land 762 being of a relatively long length has been relieved at spaced intervals so as to decrease the frictional resistance to the sliding movement thereof. The remainder of the second to third shift valve train includes a regulator plug valve 764 mounted on the opposite side of the main shift valve 750 and formed with large and small spaced lands 766 and 768. A spring 770 urges the regulator plug valve 764 and the main shift valve 750 apart. The lines connected to the ports of this valve train will be described in the operational summary.

Third to Fourth Shift Valve

The third to fourth shift valve train which is slidably mounted within a stepped bore in the valve body comprises a third to fourth shift valve proper, depicted in FIGURE 2e at 780, and provided with a large diameter land 782, an intermediate diameter land 784 and two smaller equal diameter lands 786 and 788. Positioned within the bore to the right of the shift valve 780 is a regulator plug valve 790 afforded with lands 792 and 794. These two valves 780 and 790 are biased apart by a spring 796.

OPERATIONAL SUMMARY

The operation of the hydraulic control system in conjunction with the transmission to obtain the various drive conditions, previously described, will be apparent from the following explanation.

Park and Neutral

It is contemplated that the manual valve 140 must be moved to either the Park or Neutral positions before the engine starting circuit is completed and the engine may be started. With the manual valve 140 in the Park position, linkage suitably connected to the manual valve, will cause a dog or pawl member (not shown) to engage locking teeth associated with the load shaft 12 so as to positively prevent rotation thereof and thereby restrain the vehicle from movement. When the engine has been started, the pump 100 will commence to supply fluid pressure to the main supply line 108. The pressure of this fluid will, as explained, be determined by the pressure regulator valve 110, which now becomes operative. With the manual valve 140 in either the Park or Neutral position, the land 146 will open each of the Drive Range, Intermediate Range and Low Range supply lines 174, 328 and 810 to exhaust through the open end of the valve and permit communication, due to the position of the lands 144 and 146, between the main supply line 108 and the line 180 extending to the detent valve 160. The detent relay 186 will be de-energized, and consequently, the detent valve 160 will be in the upshifted position shown. When the manual valve 140 is in the extreme left hand position corresponding to Park, the line 218, which supplies pressure fluid to the TV valve 220, is likewise open to exhaust through the end of the valve, but when the manual valve is moved to the Neutral position communication is allowed between line 108 and the TV valve supply line 218. The TV valve 220 in Neutral will operate, in the manner explained, to produce a TV pressure in line 236 reflective of the engine load and atmospheric pressure. However, with the manual valve 140 in the Neutral setting, the value of TV pressure is of no consequence.

With the coupling signal valve 390 in the position shown, line pressure will be supplied by line 108 and branch 418 thereof to a branch 811 and will be transferred between lands 396 and 398 to a coupling fill signal line 812. A branch 814 of the line 812 is connected to the right end of the coupling fill valve 440 and the fluid pressure therein will force this valve 440 to the left against the bias from the spring 446 until the lands 442 and 444 thereon permit communication between a branch 816 of the main supply line 108 and a line 818 which communicates with the coupling 44. This will start the filling of the coupling 44 at the same time that the line 812 via branch 820 supplies pressure fluid to the right end of the second to first coupling valve 350 and forces the valve with the assistance of spring 356 to its extreme left position against the opposing force from pump pressure supplied by the main supply line 108, line 490 and a branch 822 thereof communicating with the end area adjacent land 352. This same line 490 through a branch 824 supplies pressure fluid between lands 352 and 354 through a branch 826 and a line 828 to the coupling fill line 818. Therefore, the coupling 44 is supplied with pressure fluid through both the coupling fill valve 440 and a second to first coupling valve 350.

The coupling fill valve 440 functions also as a limit valve. For, if, when the coupling 44 is filling, the pressure in the main supply line and accordingly, branch 814 drops to below some predetermined value, valve 440 will close and interrupt the supply of pressure fluid to the coupling 44 until line pressure builds up again. This aspect insures that the act of filling the coupling 44 does not reduce the main line pressure to a dangerously low pressure.

The coupling fill signal line 812 extends to a coupling exhaust valve 830 rotatable with the coupling impeller 46. The valve 830 is the subject of an application S.N. 477,682 to Cheek, filed December 27, 1954, entitled Controlled Fluid Coupling, now Patent No. 2,916,881, issued December 15, 1959. Therefore, for purposes of this explanation one or more of these valves may be employed with each including large land 832 and a smaller land 834 and being slidable within a stepped bore provided for accommodating the lands 832 and 834. A spring 836 biases the valves to the uppermost position in which communication from the interior of the coupling 44 is permitted, pressure fluid being discharged by a passage 838 between lands 832 and 834 and out exterior passage 840. The proportions of the valve 830 are selected so that the centrifugal force resulting from rotation of the coupling impeller 46 will, along with the spring 836, urge the valve upwardly to the exhaust positions. To move the valve 830 to the closed position, the head thereof with the large land 832 is acted on by pressure fluid supplied by the line 812 and this pressure urges the valve 830 downwardly so that the land 832 cuts off communication between passages 838 and 840.

The governor 250 in Neutral and Park is supplied with line pressure via branch 252 and since the vehicle is not moving the governor will not be revolved. Consequently, neither a G–1 nor a G–2 pressure is developed.

This G–1 pressure, when produced, is supplied to the line 254 which has a branch 842 extending to a reverse blocker 844. The reverse blocker 844 is slidable within a bore in a housing 845 and is formed with an open slot 846 in one end thereof. Slot 846 coacts with a cross pin 848 in the housing 845 so as to limit the extent of movement of the blocker 844 to the right. A spring 850 abuts the cross pin 848 and urges the blocker 844 to the viewed disengaged position. The function of the reverse blocker 844 is, when moved by G–1 pressure at some corresponding minimum speed, e.g., 7 or 8 m.p.h., to engage with the notched end 852 linkage (not shown) controlling the manual valve 140 and prevent movement of the manual valve 140 to the Reverse position. This insures against possible damage to the transmission should the driver accidently move the manual valve 140 to the Reverse position with the vehicle moving at speeds above the 7 or 8 m.p.h.

A branch 854 of the governor supply line 254 admits G–1 pressure to the port in the bore of the first to second shift valve train between lands 712 and 714 of the shift valve 710 and also to the left end of the first to second shift valve governor plug valve 718 via another branch 856. The second to third shift valve 750 is supplied G–1 pressure between lands 752 and 754 by a branch 858. Branch 488 of the G–1 supply line transfers G–1 pressure to the left face of the first to intermediate first shift valve governor plug 694 and also to the left end of the G–3 valve 480. The G–3 valve 480 commences to regulate in accordance with G–1 pressure, as previously explained, since the valve 480 is being supplied pump pressure at this time by branch 489. Lines 494 and 498 communicate with lines 589 and 860, the latter line being connected to an exhaust port 861 in the bore of the third to fourth shift valve 780 between the lands 784 and 786 thereof.

The line 490 extending from the main supply line 108 also extends to the overdrive gear unit control device 578 where flow is halted by the valve element 588 since the overdrive gear unit relay 580 is de-energized. A branch 862 of the line 490 extends to the overdrive gear unit valve 510 and communicates with a port controlled by land 518 where it is blocked with the valve 510 in the position demonstrated. The ports between the overdrive gear unit valve lands 514 and 516 are opened establishing communication between line 862 and line 562 to the direct clutch timing valve 550. The pressure fluid in the line 562 will shift the timing valve 550 to the left until communication is established with the direct clutch supply line 564, whereupon the direct clutch 64 will be engaged by the direct clutch servo 64'.

From the foregoing it will be seen that with the manual valve 140 in either the Park or Neutral position the fluid coupling 44 is filled and the direct clutch 64 engaged while the other brakes and clutches are disengaged. The Neutral condition exists because the neutral brake 38 remains disengaged thereby eliminating the reaction for the gear units 16 and 18, and therefore, drive cannot be transferred between the power shaft 10 and the intermediate shaft 29. This aspect permits the overdrive gear unit 52 to be set for direct drive prior to establishing first speed without affecting the Neutral condition.

When it is desired to propel the vehicle in a forward direction the manual valve 140 may be positioned in either the Drive, Intermediate or Low Range positions, which will be the sequence of the following description.

Drive Range

Movement of the manual valve 140 to the Drive Range position, shifts land 146 thereon just past the port connected to the Drive Range supply line 174 whereupon communication of the main supply line 108 with line 174 is established. In this drive setting pressure fluid, as in Neutral, is transferred by line 180 to the detent valve 160 and by line 218 to the TV valve 220.

Pressure fluid in the line 174 is transferred by a branch 864 to the neutral brake valve 300 where it acts on the differential areas defined by lands 302 and 304 causing the valve 300 to be shifted to the right against the opposition from the spring 310. Upon shifting valve 300 to the demonstrated position, the land 304 blocks the port connected to a sub-branch 866 so as to force pressure fluid to proceed through an orifice 867 in a spring element 868 before proceeding through a neutral clutch supply line 870 to the neutral brake servo 38' and effecting an engagement of the neutral brake 38. Pressure fluid in the line 870 also, through a branch 872, acts on the differential areas between lands 306 and 308 increasing the leftward urging force on the valve 300.

As just described, pressure fluid is supplied to the line 870 at the slowest possible rate so that the neutral brake 38 will be engaged gradually and not produce any harshness perceptible to the driver. This is particularly important since the reaction ring gear 34 for gear unit 18 is being revolved backwards rapidly and carries therewith the one-way device 36 and the unrestrained side of the neutral brake 38. Consequently, it is preferable to retard first and finally stop this backward rotation before the neutral brake 38 is engaged. This described rate of engagement is varied with changes in manifold pressure since a branch 875 of the TV pressure supply line 236 extends to the right end of the neutral brake valve 300. If the accelerator pedal 196 is depressed appreciably, demanding a quick start, TV pressure will increase reflecting the increased engine load and urge the valve 300 to the left permitting communication between the sub-branch 866 and a branch 874 of the neutral brake supply line 870. The result is that pressure fluid is supplied to line 870 both through the orifice 867 and via passage 874 so that a quicker engagement of the neutral brake 38 is obtained for fast starts, the rate of engagement increasing with increases in engine load.

The Drive Range supply line 174 transfers pressure fluid also to a branch 876 extending to the second to third shift valve 750, where further distribution is arrested by the land 754. The other shift valves are likewise inoperative since a branch 878 extending to the first to second shift valve 710 is blocked by land 714, a branch 880 is blocked by land 784 on the third to fourth shift valve 780, and a branch 882 is blocked by land 684 on the first to intermediate first shift valve 680.

With the engine idling, the resisting forces on the load shaft 12 are sufficient to overcome any torque transferred by the coupling 44, and therefore, the fluid slip through the coupling 44 will be sufficient to prevent any creep of the vehicle.

First Speed Ratio

With the neutral brake 38 engaged the transmission, as mentioned before, is conditioned for forward drive in the first speed ratio, i.e., with the front gear unit 16 ineffective, the rear gear unit 18 set for reduction drive, and the overdrive gear unit 52 in direct drive.

When the throttle is opened to commence forward movement of the vehicle, the pressure in the intake manifold is reduced so that the TV valve 220 becomes operative in a manner previously described. TV pressure then is supplied by line 236 to each of the shift valves.

The first to intermediate first shift valve 680 is joined to line 236 by a branch 884 thereof and since it is in the downshifted position, the lands 688 and 686 align the ports connected to branch 884 and a line 886. Line 886 extends to the right end face of the plug valve 692 delivering TV pressure thereto.

The first to second shift valve 710 allows TV pressure to be transferred from a branch 888 of the TV supply line 236 between lands 722 and 724 of the governor regulator plug 718 to a line 890 extending to the right end of the regulator plug valve 730. TV pressure, when of a predetermined value, will cause the regulator plug valve 730 to start regulating the TV pressure and supply a modulated TV pressure via a passage 891 to the spring pocket between the first to second shift valve 710 and the plug valve 730. This regulation commences when passage 891 is opened by the land 734 on the plug valve 730 whereupon pressure fluid will tend to cause the regulator plug valve 730 to move between positions in which the passage 891 is opened and closed to an exhaust line 892.

The line 892 which is relied upon for exhausting the excess from the regulator plug valve 730 extends to a port in the bore of the first to second shift valve which communicates between lands 724 and 726 on the governor plug valve 718 with a port connected with a line 894 extending to the detent valve 160. With the detent valve 160 in the viewed upshifted position, the line 894 is connected to a port which is, in turn, opened by the detent valve lands 164 and 166 to an exhaust port 896.

The second to third shift valve regulator plug valve 764 operates somewhat in the same manner as regulator plug valve 730 and at its right end is subjected to TV pressure, transferred thereto by branches 875 and 900 of the TV supply line 236 between lands 756 and 758 of the second to third shift valve 750 via a line 902. When TV pressure is sufficient to overcome spring 770 and shift the regulator plug valve 764 to the left, a passage 904 to the spring pocket between the shift valve 750 and regulator plug valve 764 is opened by land 766. Then, modulated pressure fluid shifts the regulator plug valve 764 closed and opens passage 904 to exhaust through a line 906 extending to the detent valve 160. With the detent valve 160 in the upshifted position, the port connected to line 906 and the port connected to a branch 908 of the Intermediate Range supply line 328 are placed in fluid communication by lands 168 and 170 on the detent valve 160. As a result, the line 328, being opened to exhaust through the bore of the manual valve 140 and through the open end thereof, will afford the exhaust necessary for the second to third regulator plug valve 764 to regulate in the usual way.

The third to fourth shift valve train is supplied TV pressure at all times by a branch 910 of the TV supply line 236 which conducts pressure fluid to the right end of the third to fourth regulator plug valve 790. In the same manner as the first to second and the second to third regulator plug valves 730 and 764, the third to fourth regulator plug valve 790 is forced to the left by TV pressure against the bias from spring 796 until a passage 914 is opened so as to supply pressure fluid to the area between valves 780 and 790. The pressure in the spring pocket will shift the valve 790 back to the right until the pressure therein is relieved through a port connected to the Intermediate Range supply line 328 which, as just mentioned, is opened to exhaust through the bore of the manual valve 140 when the manual valve 140 is in the Drive Range position.

As the vehicle speed increases, both G–1 and G–2 pressures will increase with G–2 rising slower than G–1. Hence, G–2 pressure will be transferred to the left end of the second to third governor regulator valve 760 by the G–2 supply line 256 and by a branch 916 thereof to the differential areas on the third to fourth shift valve 780 established by lands 782 and 784. This G–2 pressure is inadequate at this time to cause either the second to third or the third to fourth valve 750 and 780 to upshift.

As G–1 pressure increases, the G–3 pressure developed by the G–3 valve 480 and supplied to the first to intermediate first shift valve 680 by line 496 will continue to build up. However, until a selected vehicle speed is attained, the first to intermediate first shift valve 680 and the others will remain in the downshifted positions and the transmission will continue to operate in the first speed ratio.

*Shift First to Intermediate First*

With the vehicle progressing forwardly, the load shaft 12 will eventually attain a speed such that the G–1 pressure acting on the end of the G–3 valve 480 will produce a G–3 pressure high enough to cause the first to intermediate first shift valve 680 to be shifted to the right and the upshifted position. G–1 pressure also acts on the left end of the governor plug valve 694 so that G–1 pressure and G–3 pressure together urge the shift valve 680 to the upshifted position against the opposition from TV pressure and the force from spring 690. If the engine load is too great, as reflected in the amount of TV pressure present in the line 886, the upshift will be delayed so that the ratio in first speed can be fully realized for rapid vehicle acceleration.

Upon upshifting the first to intermediate first shift valve 680, the lands 684 and 686 thereon permit communication between the branch 882 of the supply line 174 and a line 918. The line 918 is connected to a port in the bore for the first to second shuttle valve 460 which will be in the illustrated position. Therefore, the shuttle valve lands 464 and 466 establish communication between the port connected to line 918 and a port connected to a line 920 extending to the left end of the overdrive gear unit valve 510.

The pressure in the line 920 being the same as main line or pump output will overcome the opposition of the spring 512 and shift the relay valve 510 to the right in which position lands 514 and 516 will align an exhaust port 922 with the port connected to line 562 extending to the right end of the direct clutch timing valve 550. The pressure in the line 562 will be relieved and TV pressure acting on the opposite end of the valve 550 will shift it to the right, whereupon the exhaust port 566 will communicate between lands 552 and 556 with the direct clutch supply line 564. The direct clutch servo 64′ will be exhausted and the direct clutch 64 disengaged. While this is taking place the lands 516 and 518 on the overdrive gear unit valve 510 will connect the ports to a branch 924 which is supplied from the main supply line 108 by branches 862 and 490 and the supply line 540 for the overdrive brake servo 62′. An orifice 926 in branch 924 slows up the supply of pressure fluid to the line 540 which, with the accumulation effect from the overdrive brake accumulator 530, aids in obtaining a smooth engagement of the overdrive brake 62.

The accumulation effect, as has been explained, is controlled by TV pressure so that the torque load on the engine determines the rate of engagement of the overdrive brake 62. This, of course, is necessary, since once the shift has been initiated, the torque load should determine how quickly an engagement is made. If too slow a runaway sensation is felt; if too fast then an abruptness is sensed. It should be noted here that the overdrive gear unit valve 510 in moving to the right first commences disengagement of the direct clutch 64 before fluid pressure is supplied to the overdrive brake servo 62′.

With overdrive brake servo 62′ being supplied pressure fluid and the direct clutch servo 64′ being exhausted, the overdrive brake 62 will engage and the direct clutch 64 disengage, thereby reconditioning the overdrive gear unit 52 for an overdrive ratio. Since the front and rear gear units 16 and 18 retain their first speed status, intermediate first speed is now established.

*Shift Intermediate First to Second*

When vehicle speed has increased still further the combination of the G–1 pressure acting on the end of the first to second shift valve governor plug valve 718 via branch 856 of G–1 pressure supply line 254 and that acting on the differential areas determined by lands 712 and 714 of the shift valve 710 via branch 854 will cause the entire shift valve train to move to the right. As a result, land 722 on the governor plug valve 718 will interrupt the transfer of TV pressure between branch 888 and line 890 and lands 714 and 716 on the shift valve 710 will align ports for branch 878 of the Drive Range supply line 174 and a branch 928 of the second speed clutch supply line 658. Pump pressure is then supplied to both the second speed clutch accumulator 660 and the second speed clutch servo 50′. An orifice 930 in the branch 878 is afforded to slow up engagement of the second speed clutch 50. Also, the accumulator 660 regulates the rate of engagement of the second speed clutch 50 in the manner previously described. In this instance, the trimmer valve 620 is effective to modulate TV pressure which is then supplied by line 646 to the accumulator 660 and assists spring 666 in maintaining the piston 664 in its lowermost position. The pressure fluid in the line 658 will, depending upon the amount of opposition, cause the piston 664 to be shifted upwardly and the resultant space, as it is being filled with fluid, will cause a pressure drop in the line 658. The amount of this pressure drop, of course, is determined by the TV pressure, in turn, determined by the load on the engine, so that, as explained before, the engagement of the clutch 50 will be slow with light torque loads and fast with heavy torque loads, once the shift has been initiated.

Pressure fluid in the second speed clutch supply line 658 is, in addition, transferred by a branch 932 to the left end of the coupling signal valve 390 and will shift this valve to the right against the opposing force from the spring 400. When so shifted, lands 394 and 396 will connect the coupling fill signal line 812 to an exhaust port 934 and the lands 398 and 396 will connect the ports joined to branch 811 of the main supply line branch 418 and a line 936. Therefore, line 936 will supply pump pressure to the left end of the coupling fill valve 440 and assist the spring 446 in shifting this valve to the depicted position. Since the fluid pressure that existed in the line 812 and maintained exhaust valves 830 in their closed position is now relieved, the valves 830 will be moved upwardly to the open position by the springs 836 and by centrifugal force produced from the rotation of the coupling impeller 46 and commence draining the coupling 44 through passages 838 and 840. Assisting in draining the coupling 44 is the second to first coupling valve 350 which, with the pressure furnished by the branch 820 of line 812 to the right end thereof relieved, will be shifted to the right by line pressure in the branch 822 and will open the branches 826 and 828 of the coupling fill line 818 to an air vent 938. Air vent 938 is above the level of fluid in the sump and insures, when the coupling 44 is drained, against the formation of a partial vacuum which would interfere with quick drainage. Therefore, as fluid exhausts out the exhaust valves 830, air supplied by vent 938 replaces the fluid. With the coupling supply being cut off by the coupling fill valve 440 and the second to first coupling valve 350, along with the exhaust valves 830 draining the coupling 44, the effectiveness thereof will be reduced rapidly, as the second speed clutch 50 starts to assume the drive.

Line 936 also extends to the left end of the first to second shuttle valve 460, and the fluid pressure therein will move the valve 460 to the rightmost position so as to cause land 466 to block line 918 and open line 920 between lands 464 and 466 to line 859, which at this time is drained through line 860 and between the lands 784 and 786 of the third to fourth valve 780 to the exhaust port 861. With the pressure in line 920 relieved, the overdrive gear unit valve 510 will be shifted back to the illustrated position and will again cause pressure fluid to be supplied to line 562 and then through the direct clutch timing valve 550 to the direct clutch supply line 564, whereupon the direct clutch servo 64' will be actuated and the direct clutch 64 re-engaged. At the same time the supply line 540 to the overdrive brake servo 62' is relieved through exhaust port 922 in the bore of the overdrive gear unit valve 510, thereby disengaging the brake 62. By having the coupling signal valve 390 actuated by the pressure fluid being supplied to the second speed clutch servo 50', the second speed clutch 50 will become effective before the direct clutch 64. Otherwise, an intermediate first to first shift might happen.

With these conditions the transmission now has the front gear unit 16 conditioned for reduction drive, the overdrive gear unit 52 set for direct drive, and the rear gear unit 18 ineffective with coupling 44 drained. Consequently, drive ratio is, as previously mentioned, determined by that of the front gear unit 16.

*Shift Second to Third*

As vehicle speed continues to increase, the G–1 and G–2 pressures supplied by the governor 250 will become great enough to produce the second to third speed shift which will occur as follows. G–1 pressure delivered by supply line 254 and the branch 858 thereof to the differential areas established by lands 752 and 754 on the second to third shift valve 750 and the G–2 pressure supplied by supply line 256 to the left end of the governor plug valve 760 will cause the entire second to third shift valve train to move to the right and to the upshifted position against the opposition from TV pressure acting along with the spring 770 on the end of the land 752 of the second to third shift valve 750. In this upshifted position, communication between the TV supply line branch 900 and line 902 is cut off by land 758 eliminating the effect of TV pressure on the regulator plug valve 764 and the lands 754 and 756 on the shift valve 750 align the ports connected to branch 876 of the Drive Range supply line 174 and to the outlet line 602. A branch 940 of line 602 extends to the right end of the coupling signal valve 390 and delivers the pressure fluid thereto which, after moving the valve 390 to the left so that the port connected to line 936 is opened by valve land 398, will proceed to the spring side of the coupling fill valve 440. When the coupling signal valve 390 moves to the left, branches 811 and 418 of the main supply line 108 and the coupling fill signal line 812 are again connected enabling pressure fluid to be delivered via branch 814 of line 812 to the opposite side of the coupling fill valve 440. The combination of line pressure and the spring 446 will hold the coupling fill valve 440 in the demonstrated position so that the coupling fill line 818 will not be connected to the branch 816 of the main pump supply line 108. In addition, the pressure fluid in the line 936, although supplied by a different route, continues to maintain the first to second shuttle valve 460 in the rightmost position as in second speed so that the overdrive gear unit valve 510 is not moved and the direct clutch 64 remains engaged. The pressure fluid in the line 812, as explained before, is transferred to the top of the coupling exhaust valves 830 closing the drain passages 838 and 840 from the coupling 44. This same presure fluid in line 812 via branch 820 moves the second to first coupling valve 350 back to the position illustrated, in which line pressure is transferred from branches 490 and 824 of the main supply line 108 between lands 352 and 354 through branches 826 and 828 of the coupling fill line 818 and then by line 818 to coupling 44. With the coupling 44 being filled only through the second to first coupling valve 350 fill is, necessarily, slower than when the coupling fill valve 440 assists and as a result a smoother transition is obtained during this change in speed ratios.

When the second to third shift valve 750 is upshifted, pressure fluid in the line 602 is delivered to the pressure switch 600. The switch is then closed, readying the circuit for the overdrive gear unit control device 578 for manual operation upon closure of switch 598, as will be described.

In the third speed, the coupling 44 is operative, the second speed clutch 50 is engaged, and the direct clutch 64 remains engaged. Therefore, the front, rear, and overdrive gear units 16, 18 and 52 are conditioned for direct drive with the drive train being as aforedescribed.

*Shift Third to Fourth*

A further increase in vehicle speed will, accordingly, increase sufficiently the G–2 pressure delivered by branch 916 of the supply line 256 to the differential areas defined by the lands 782 and 784 on the third to fourth shift valve 780. The resultant force which is greater than that from the combination of the modulated TV pressure and the spring 796 will cause the third to fourth shift valve 780 to move to the right and to the upshifted position. Lands 784 and 786 will align the ports connected to the branch 880 of the Drive Range supply line 174 and to the line 880. Since the first to second shuttle valve 460 is in the rightmost position, the ports connected to the lines 859 and 920 communicate between lands 464 and 466 on the shuttle valve 460 so that pressure fluid is transferred by lines 860, 859 and 920 to the left end of the overdrive gear unit valve 510. This valve 510, then, as during the shift from first to intermediate first speed, is moved to the right draining the direct clutch supply line 562 through exhaust port 922 while supplying the overdrive brake supply line 540 with pressure fluid from branches 862 and 490 of main supply line 108. The overdrive brake accumulator 530 times the engagement of the overdrive brake 62 in conjunction with the TV pressure in the branch 542, as aforedescribed.

With the overdrive brake 62 again engaged and both the front and rear gear units 16 and 18 retaining their third speed status, the transmission will be conditioned for the overdrive ratio with the load shaft 12 being revolved faster than the input intermediate shaft 29.

*Manual Fourth to Third Shift*

A downshift from fourth to third speed can be obtained or an upshift from third to fourth speed can be prevented simply by closing the manually operable switch 598, i.e., by moving the switch 598 to the direct drive position. With switch 598 closed and the pressure switch 600 likewise closed by the pressure fluid in line 602, the circuit to the energizing winding 581 will be completed, energizing relay 580 so as to pull the end of the armature 582 downwardly and raise the valve element 588 to the position in which the head 590 closes exhaust port 594. Communication between line 592 and branch 490 of the main supply line 108 is then established and the fluid pressure therein which is the same as pump output pressure will act along with spring 512 to shift or to maintain, as the pre-existing condition may be, the overdrive gear unit valve 510 in the downshifted or direct clutch engaged position. In effect, closing switch 598 supplies line pressure to the spring end of the valve 510 and this pressure along with the bias from the spring 512 will be sufficient to hold the overdrive gear unit valve 510 in the direct clutch engaged position whether or not the opposite end of valve 510 is exposed to pressure supplied by line 920. When in third speed and the overdrive ratio is desired, it can be obtained, assuming the third to fourth shift valve 780 is upshifted, by opening the switch 598, i.e., moving it to the overdrive position.

Manual Fourth to Second Shift

To produce a manual downshift from fourth to second speed, the manual valve 140 is moved from the Drive Range position to the Intermediate Range position. In the Intermediate Range position, the manual valve lands 144 and 146 align the porting in the bore of the manual valve so that communication is established between the main supply line 108 and the Intermediate Range supply line 328. The pressure fluid in line 328 is transferred to a port controlled by the third to fourth shift regulator plug valve 790 and then via passage 914 to the spring pocket in which spring 796 is positioned. This fluid pressure being the same as pump output and therefore greater than G-2 pressure will force the third to fourth shift valve 780 to the viewed downshifted position. Pressure fluid which has been supplied to the first to second shuttle valve 480 through lines 860 and 859 and then via line 920 to the left end of the overdrive gear unit valve 510 is cut off by land 784 on the third to fourth shift valve 780. With this pressure removed, the overdrive gear unit valve will return to the depicted position in which the direct clutch 64 is re-engaged and the overdrive brake 62 is disengaged in the foregoing described manner.

The Intermediate Range supply line 328 is also through branch 908 connected by the detent valve lands 168 and 170, when the detent valve 160 is in the demonstrated position, to line 906 extending to the second to third regulator plug valve 764. This pressure fluid in line 906 will in a manner similar to that delivered to the third to fourth regulator plug valve 790, be transferred by passage 904 to the spring pocket housing spring 770 and cause the second to third shift valve 750 to be moved to the downshifted position. Consequently, the shift valve land 754 will interrupt the supply of pressure fluid to line 602 allowing pressure switch 600 to open and to the branch 940 thereof. With the supply of pressure fluid to branch 940 cut off, the coupling signal valve 390 will be moved to the right so as to connect line 812 and the branches 814 and 820 between the lands 394 and 396 to exhaust port 934. Then as has been described, the coupling 44 will be exhausted both by the second to first coupling valve 350 and the coupling exhaust valves 830.

When the coupling signal valve 390 is shifted to the right, the lands 396 and 398 connect branch 811 and line 936 so that fluid pressure, previously supplied by branch 940, is still furnished to the coupling fill valve 440 and the first to second shuttle valve 460 maintaining them in the fourth speed positions. This aspect is particularly important with respect to the first to second shuttle valve 460, since the valve 460 must not change positions if the line 920 is to be exhausted through the downshifted third to fourth shift valve 780 so that the overdrive gear unit valve 510 re-engages the direct clutch 64. Now that the coupling 44 is inoperative and the direct clutch 64 re-engaged, second speed will be established with the front gear unit 16 affording the reduction ratio.

Detent Fourth to Second Shift

To initiate a detent fourth to second downshift, the vehicle must be proceeding at some speed below a predetermined maximum, e.g., below 65 m.p.h. Then, when the accelerator pedal 196 is depressed to the detent position in which the throttle is substantially fully opened, the switch 190 will close, thus completing the circuit from battery 192 to the detent relay 186. The energization of the relay winding 187 moves the valve element 202 downwardly from the depicted position so that the pressure fluid in the chamber 178 is exhausted through restriction 184. As a result, the pressure fluid in chamber 172 acting on the opposite end of the detent valve 160 will overcome spring 162 and shift the detent valve 160 to the left so that the lands 168 and 170 thereon align the ports connected to a branch 942 of the Drive Range supply line 174 and line 906. The pressure fluid in the line 906 is delivered thereby to the second to third regulator plug valve 764 and will cause the second to third shift valve 750 to downshift. With the valve 750 downshifted the coupling 44 will be exhausted in the manner described before with respect to the manual fourth to second shift. Likewise, the action of the coupling signal valve 390, the coupling fill valve 440, and the first to second shuttle valve 460 will be the same, each assuming the previously described second speed positions.

To complete the detent fourth to second shift, the third to fourth shift valve 780 must downshift so as to interrupt the pressure fluid supply to the left end of overdrive gear unit valve 510 in the same way as during the manual fourth to second downshift. By the arrangement of the third to fourth shift valve train, the detent downshift thereof can preferably take place only below the selected speed, in this instance 65 m.p.h. This is because the TV pressure, which is continuously supplied to the third to fourth regulator plug valve 790, will be maximum when the accelerator pedal 196 is depressed to the detent position and will provide a force greater than the opposing force from G-2 pressure below 65 m.p.h. It should be noted that both the G-1 and G-2 pressures decrease when the overdrive ratio becomes effective in fourth speed because of the reduction in the speed of the load shaft 12 and accordingly, the governor 250. Therefore, the maximum TV pressure will dominate and downshift shift valve 780.

Detent Fourth to Intermediate Second Shift

At vehicle speeds above 65 m.p.h. and below some speed, for instance, 80 m.p.h., maximum TV pressure from a detent downshift is not adequate to downshift the third to fourth shift valve 780. Hence, the overdrive gear unit valve 510 will remain in the fourth speed position and the overdrive brake 62 will still be engaged so that the overdrive gear unit 52 continues in overdrive. Under these conditions a speed ratio, referred to as intermediate second, is obtained that is between the second and third speeds. In intermediate second the coupling 44 is inoperative and the second speed clutch 50 and the overdrive brake 62 both are engaged so that the ratio will be determined by the product of that from the front gear unit 16 and the overdrive gear unit 52.

The reason a detent downshift from fourth speed affords less ratio above the chosen 65 m.p.h. speed than below is that it is not as essential to have such rapid acceleration above 65 m.p.h. Furthermore, the downshift to a smaller

Forced Fourth to Third Shift

A downshift from fourth to third speed can be produced at selected speeds, for instance, between 21 and 65 m.p.h., without depressing the accelerator pedal 196 to the detent position, i.e., the position in which the switch 190 is closed to energize the detent relay 186. This is because the third to fourth regulator plug valve 790 is always exposed to TV pressure so that, when the proper relationship exists between G-2 pressure, reduced, as mentioned, somewhat in fourth speed because of the overdrive aspect, and the TV pressure developed by the increased engine load from the nearly full throttle opening, the third to fourth shift valve 780 will be downshifted. This will disengage the overdrive brake 62 and engage the direct clutch 64 in the previously described way.

Forced Fourth to Second Shift

Below 65 m.p.h. and above 21 m.p.h., a downshift from fourth to second can be enforced by depressing the accelerator pedal 196 to slightly above the detent position. The resultant TV pressure from the increased load on the engine, which is then transferred by the supply line 236 and branch 416 to the large diameter end of the part throttle third to second TV valve 410, will generate a force adequate to overcome the opposing force from line pressure delivered by branch 418 of the main supply line 108 to the small diameter end of the valve 410. Consequently, the part throttle third to second TV valve 410 will be moved to the right and then TV pressure will be transferred via line 420 to the second to third shift valve 750. Since the shift valve 750 is in the upshifted position, the port connected to line 420 communicates between lands 756 and 758 with the port connected to the line 902 which extends to the right end of the regulator plug valve 764. As a result, the second to third shift valve 750 will be downshifted. Also, TV pressure will be adequate to downshift the third to fourth shift valve 780 in the same way described during the fourth to third forced downshift explanation. Therefore, when these valves 750 and 780 downshift, second speed will be established, as described during the manual fourth to second shift description with the coupling 44 drained, the direct clutch 64 re-engaged and the second speed clutch 50 still engaged.

Forced Fourth to Intermediate Second Shift

At certain vehicle speeds, for example, above 65 m.p.h. and below 80 m.p.h., the same as with a detent fourth to intermediate second shift, a forced fourth to intermediate second shift can be produced by depressing the accelerator pedal 196 a predetermined distance but not to the detent position. Therefore, the second to third shift valve 250 will be downshifted as during a forced fourth to second downshift draining the coupling 44. Because TV pressure is not sufficient to overcome G-2 pressure acting on the third to fourth shift valve 780 at above 65 m.p.h., the shift valve 780 will remain upshifted, and accordingly, the overdrive brake 62 will still be engaged establishing intermediate second speed.

Detent Third to Second Shift

If an upshift has not been made to fourth speed and vehicle speed is within a predetermined range, e.g., 12 to 62 m.p.h., then a detent downshift can be made to second speed by depressing the accelerator pedal 196 to the detent position. This will, as with a detent fourth to second downshift, cause the second to third shift valve 750 to be downshifted, pressure fluid having been transferred from the downshifted detent valve 160 through line 906 to the second to third regulator plug valve 764. As a result, the fluid coupling 44 will be drained and the transmission conditioned for second speed drive.

Forced Third to Second Shift

This shift takes place with the vehicle proceeding in third speed within the same sped range as required for a detent third to second shift, namely, 12 to 62 m.p.h., and in a similar manner. The shift is commenced by depressing the accelerator pedal 196 an appropriate distance, but not to the detent position. The corresponding TV pressure in the supply line 236, assuming it is adequate, will shift the part throttle third to second TV valve 410 to the right and supply this TV pressure to the right end of the second to third regulator plug valve 764 via lines 420 and 902, being in communication between lands 756 and 758 of the upshifted second to third shift valve 750, as has been previously mentioned. The second to third shift valve 750 will therefore downshift with the coupling 44 being drained to establish second speed drive.

Part Throttle Third to Second Shift

Because of the part throttle third to second TV valve 410, a downshift from third to second speed can be made with the accelerator pedal 196 only partially depressed. The load on the engine with this part throttle opening must be sufficient to produce a TV pressure of 70 p.s.i., the amount mentioned by way of example before. The 70 p.s.i. pressure, because of the differential areas of valve 410, will be adequate to overcome line pressure. Therefore, the valve 410 will open and supply this TV pressure via line 420 to the second to third shift valve 750 whereupon the second to third shift valve will downshift, as explained, assuming the combined forces from G-1 and G-2 pressures is less than that from the TV pressure. This feature enables the driver to obtain a downshift at relatively low speeds without depressing the accelerator pedal 196 to the detent position.

Intermediate Range Operation

To obtain the Intermediate Range of operation, the manual valve 140 is moved to the right and to the Intermediate Range position in which, as explained during the description of the manual fourth to second shift, the third to fourth shift valve 780 is prevented from upshifting by its connection with the Intermediate Range supply line 328 and the second to third shift valve 750 held in the downshifted position by fluid pressure supplied thereto via branch 908 of line 328, through the detent valve 160, and to line 906. The pressure fluid holding the shift valve 750 in the downshifted position being the same as pump output will prevent the second to third shift valve 750 from upshifting until a predetermined vehicle speed is attained, which may, for instance, be approximately 70 miles per hour.

First speed in the Intermediate Range as well as the shift to intermediate first and from intremediate first to second speed are all obtained and take place in the same manner as in Drive Range. One difference occurs in second speed for in the Intermediate Range the overrun brake 42 is engaged so that the engine may be utilized for braking. This is effected by modulated fluid pressure from the overrun modulator valve 320. The modulator valve 320, as has been explained, receives fluid pressure at pump output from branch 327 of the Drive Range supply line 328 and provides a reduced or modulated pressure to line 330. Because the torque transmitted by the overrun brake 42 is less in second speed, the pressure is reduced to obtain a smother engagement of the overrun brake 42 in Intermediate Range. Of course, when the engine drives instead of the wheels, as during overrun, the one-way device 36 and neutral brake 38 still assume the reaction load. Modulated fluid pressure is transferred from line 330 between lands 392 and 394 of the coupling signal valve 390, being in the rightmost position, to a line 950, and then with the first to second governor plug valve 718 in the upshifted position between lands 726 and 728 thereof to a line 952 extending to the overrun brake servo 42' which engages the overrun brake 42.

Overrun brake 42 holds both the front and rear unit reaction gears 22 and 34 against rotation in either direction, although in second speed concern is only for reaction gear 22. Hence, when drive is from the vehicle wheels and the tendency is for the front unit reaction gear 22 to be revolved forwardly, which would have been allowed by the one-way device 36, the overrun brake 42 will effectively prevent such rotation. If the reaction gear 22 could revolve forward, the front gear unit 16 would be without a reaction gear and the gear unit 16 would become ineffective, thereby interrupting the connection between the power and load shifts 10 and 14 during overrun. Consequently, engine drag or resistance would not be of any assistance in retarding vehicle movement.

*Manual Second to First Shift*

To obtain this downshift, the manual valve 140 is moved to the Low Range position in which the lands 144 and 146 connect the Low Range supply line 810, in addition to lines 174 and 328, to the main supply line 108. Land 144 will arrest the fluid flow from line 108 to line 180, and therefore, the detent valve control chamber 178 will be relieved and the pressure in the opposite control chamber 172 will downshift the detent valve 160. The fluid pressure in the Intermediate Range supply line 328 will continue to maintain the third to fourth shift valve 780 in the downshifted position while the line 906 extending to the second to third shift valve 750 will now be supplied by branch 942 of the Drive Range supply line 174 and the fluid pressure in line 906 will continue to maintain the second to third shift valve 750 in the downshifted position. The downshifted detent valve 160, in addition, transfers pressure fluid from branch 942 to the line 894 extending to the first to second governor plug valve 718. Pressure fluid in line 894, therefore, will be transferred between lands 724 and 726 thereof through line 892 and then by the first to second regulator plug valve 730 to line 891 and the spring pocket between the first to second shift valve 710 and the regulator plug valve 730. The presence of this pressure fluid in the spring pocket will maintain the first to second shift valve 710 in the downshifted position. A branch 954 of the line 894 extends to the first to intermediate first governor plug valve 694 and opposes G-1 pressure so that the first to intermedite first shift valve 680 will be held in the downshifted position until some predetermined speed is attained, e.g., 32 m.p.h.

With all of the shift valves downshifted in the foregoing manner the transmission will be in first speed and remain there until the 32 m.p.h. is attained.

*Detent Second to Intermediate First Shift*

A detent second to intermediate first downshift can be made within a selected speed range, e.g., above 14 m.p.h. and below 43 m.p.h. by depressing the accelerator pedal 196 to the detent position closing switch 190 so as to energize the detent relay 186. Then, as explained, the pressure fluid in the control chamber 178 is relieved and that in chamber 172 will shift the detent valve 160 to the left transferring pressure fluid from the branch 942 of the Drive Range supply line 174 to line 894. From the line 894 the pressure fluid will be transferred between lands 722 and 724 of the upshifted first to second governor plug valve 718 to the line 890 extending to the right end of the first to second regulator plug valve 730. This pressure fluid will act upon the face of the valve 730 causing it to open and admit pressure fluid via passage 891 to the space between shift valve 710 and the valve 730 and move the shift valve 710 to the downshifted position. The shift valve land 714 in the downshifted position will then cut off the supply of fluid pressure from branch 878 of the Drive Range supply line 174 to the left end of the coupling signal valve 390 through branch 928, line 658, and branch 932. With the first to second shift valve 710 in the downshifted position, the lands 714 and 716 will connect the ports joined to the branch 928 of the second speed clutch supply line 658 and a line 960 extending through the bore of the second to first downshif valve 370 to the downshifted second to third shift valve 750. The second to third shift valve lands 754 and 756 then connect the lines 960 and 602 and branch 940 of the latter which extends to the right end of the coupling signal valve 390.

With the coupling signal valve 390 having the second speed clutch apply pressure acting upon opposite ends thereof, the spring 400 will move the valve 390 to the demonstrated position in which, as has been explained, fluid pressure is supplied by the line 812 via branches 814 and 820, respectively, to the coupling fill valve 440 and the second to first coupling valve 350. But, because the pressure in line 936 (the same as that in branch 940) at this time corresponds to line pressure, the sum of the forces from this pressure and the spring 446 will hold the coupling fill valve 440 in the illustrated position and as during the second to third shift the coupling 44 will be filled initially only through the first to second coupling valve 340. This desirably starts the filling of the coupling 44 gradually at the time when the second speed clutch is still fully effective.

At this point the second to first downshift valve 370 becomes operative to control the relief of the fluid pressure in line 658 and the branches thereof through an exhaust port 962 in the second to first downshift valve bore, the port 962 being the only drain provided for the second speed clutch supply line 658. By the construction shown, TV pressure, which is a maximum because of the detent position of the accelerator pedal 196, acts on one end of the second to first downshift valve 370 and opposes both the pressure in line 960 acting on the opposite end and the bias effect from the springs 374 and 376. The relative biases of the springs 374 and 376 and diameter of the valve member 372 are such that the pressure in line 960 will initially be maintained at some predetermined value by the action of the valve 370. To assist in maintaining this predetermined pressure value, the second speed clutch accumulator 660 acts as a pump and replenishes the pressure fluid drained out exhaust port 962 by the valve 370 for an interval determined by the capacity of the accumulator 660. Preferably, the predetermined pressure value is sufficient, e.g., 35 p.s.i., to keep the clutch 50 only partially engaged and allow, due to the resultant slippage, the engine speed to increase. In so doing, the speed of pump 100 will be increased so as to supply more fluid pressure for filling the coupling 44.

The resultant 35 p.s.i. pressure will be transferred by branch 932 of supply line 658 and branch 940 to opposite ends of the coupling signal valve 390, and, therefore, the spring 400 will continue to prevail and maintain the coupling signal valve 390 in the viewed position. This 35 p.s.i. pressure in line 936 will maintain the first to second shuttle valve 460 in its rightmost position, but because the combined forces from the spring 446 and the 35 p.s.i. pressure are less than the force from the pressure in the branch 814 acting on the left end, the valve 440 will now open and establish communication between the coupling supply line 818 and the branch 816 of the main supply line 108. The direct clutch 64 will stay partially engaged and the coupling 44 will be filled rapidly both through the second to first coupling valve 350 and the coupling fill valve 440. When the pressure in the coupling 44 builds up to a predetermined point, such as 30 p.s.i., it will be sensed by the second to first downshift valve 370, the coupling supply line 818 being connected by the branch 828 with the right end of the valve member 372, and alter the control action of the second to first downshift valve 370. When this happens, the second speed clutch 50 will finish disengaging at a rate determined both by TV pressure and the pressure build-up in the coupling 44, and the first to second shuttle valve 460 will move back to the viewed position and align line 918 from the first to intermediate first shift valve 680 with line 920 extending to the overdrive gear unit valve 510. The overdrive gear unit valve 510 will then supply the overdrive brake servo 62' with pressure fluid through the direct clutch timing valve 550 and engage the overdrive brake 62.

The foregoing sequence of events results in the coupling 44 being filled rapidly while the second speed clutch 50 is, initially, partially disengaged and then subsequently disengaged at a controlled rate. Intermediate first is, therefore, established smoothly and gradually although made with a substantially wide open throttle.

*Detent Intermediate First to First Shift*

It is possible, with the vehicle proceeding in intermediate first speed at speeds within a selected range, e.g., 5 to 15 m.p.h., to obtain a detent downshift to first speed by depressing the accelerator pedal 196 to the detent position so as to downshift detent valve 160 in the foregoing described manner. When the detent valve 160 is downshifted, lands 166 and 168 thereon establish communication between the branch 942 of the drive supply line 174 and the line 894. As a result, pressure fluid is supplied by the branch 954 of line 894 to the first to intermediate first plug valve 694. The resultant force from the fluid pressure in branch 954 will oppose G-1 pressure and make the first to intermediate first shift valve 680 move to the demonstrated position cutting off pressure from branch 882 of the drive supply line 174 to the line 918. Since the first to second shuttle valve 460 is in the depicted position, the connected line 920 to the left end of the overdrive gear unit valve 510, along with line 918, will be exhausted through an exhaust port 964 in the bore of the first to intermediate first shift valve. Consequently, the overdrive gear unit valve 510 will be shifted to the left and, as described, cause the overdrive brake 62 to be disengaged and the direct clutch 64 engaged establishing first speed.

*Manual Low Range*

For Low Range operation, the manual valve 140 is shifted to the right and to the Low Range position. Then, as described during the manual second to first shift explanation, all of the shift valves are held in the downshifted position causing the transmission to be conditioned for first speed drive. The transmission will continue in this speed ratio until the mentioned speed of 32 m.p.h. is attained.

*Reverse Drive*

For reverse drive the manual valve 140 is shifted to the Reverse position in which the lands 142 and 144 align ports connected to the main supply line 108 and a reverse supply line 970 extending to the reverse brake servo 67'. Land 142, in the Reverse position, arrests communication between the reverse supply line 970 and an exhaust port 972, thus communication existing in all other positions of the manual valve 140. The pressure fluid transferred to the reverse brake servo 67' will engage the reverse brake 67 and hold the front unit ring gear 20. The remainder of the control system has the same status as in Neutral, with pressure fluid being supplied by the main supply line 108 via branches 418 and 811 through the coupling signal valve 390 and then by line 812 and branch 814 to the coupling fill valve 440 positioning this valve 440 so as to connect branch 816 of the main supply line 108 with the coupling fill line 818. The coupling 44 is also filled from the main supply line 108 by branches 490 and 824 through the second to first coupling valve 350 and branch 828 of the line 818. In addition, branch 490 is connected via branch 862 to the overdrive gear unit valve 510 which, in the illustrated position, will, as explained, allow pressure fluid to be supplied to the direct clutch servo 64' and engage the direct clutch 64.

As mentioned before, in Reverse drive the power flow is from the shaft 10 through coupling 44 to the rear gear unit 18. The rear unit ring gear 23 is revolved backwards, this being permitted with the neutral brake 38 engaged, and will, in turn, revolve the front unit sun gear 22 backwards. With the front unit ring gear 20 held stationary by the reverse brake 67; the front unit carrier 26, the rear unit carrier 28 and the intermediate shaft 29, will all be revolved at a reduced speed in a reverse direction, as will the load shaft 12.

*Closed Throttle Downshifts*

When the vehicle is being brough to a rest, downshifts will occur in reverse order but at points different from those at which the upshifts occur, i.e., if an upshift is scheduled to occur at 15 miles per hours, a downshift will occur at a lower speed, e.g., 10 miles per hour. One reason for this is that TV pressure is reduced to a minimum when a throttle is closed. Another reason is due to the hysteresis effects designed into the system through the use of differential areas on the shift valves. For instance, it will be noted that land 784 on the third to fourth shift valve 780 has a larger diameter than land 786. Consequently, the land 784 has a greater area exposed to pressure fluid in the line 880 when the valve 780 is in the upshifted position. Hence, a greater hydraulic force is exerted on land 784 because of the greater exposed surface which tends to hold the third to fourth shift valve in the upshifted position. Governor pressure acting on this valve train must, therefore, drop to a lower value than would be necessary to move the valve train to the right and the upshifted position under a similar or equivalent TV pressure.

The other shift valves in the system all have this hysteresis effect from differential areas. For instance, the second to third shift valve 750 has a larger diameter land 754 than land 756. The first to second shift valve 710 a larger diameter land 714 than land 716, and the first to intermediate first shift valve 680 a larger land 684 than land 668.

*Exhaust of the System*

After the vehicle is brought to rest, the engine stopped, and the manual valve 140 positioned in either the Neutral or Park position, the system is exhausted as follows, keeping in mind that the overdrive brake 62 and the second speed clutch 50 will have been disengaged during the downshift cycle, in the manner previously described. The coupling 44 will be drained to the extent permitted by the coupling exhaust valves 830, since it is possible for these coupling valves to be positioned, when the impeller 46 stops, in their respective highest positions. The remaining fluid will, over an extended period, leak out of the coupling enclosure. The reverse brake 67, if the vehicle had previously been in reverse, will be drained through the manual valve 140 out exhaust port 972. The neutral brake servo 38' will, through the spring element 868 which will be displaced and the neutral brake valve 300 exhaust through the open end of the manual valve 140. The overrun brake servo 42' exhausts through line 952 between lands 726 and 728 of the first to second shift valve governor plug valve 713, the Low Range supply line 810, and then, through the open end of the manual valve 140. The direct clutch servo 64' drains through the exhaust port 566 with the direct clutch timing valve 550 in the depicted position.

In the foregoing manner, all of the friction engaging devices establishing the various torque trains through the transmission are released, discontinuing drive through the transmission in either direction.

The control system just described affords six forward speeds and a reverse. However, the construction of the control system is such that various components can be eliminated without upsetting the intended operation and provide other combinations of speeds, as will be understood by those versed in the art. For example, the foregoing six-speed transmission and control system can be easily made into a three-speed transmission simply by eliminating the overdrive gear unit 52 and the valving used to control this unit. As a consequence, the intermediate shaft 29 will become the output shaft and the front and rear units 16 and 18 will function as described affording the same first, second and third forward speed ratios as well as the same reverse. The intermediate first, intermediate second, and fourth speeds are, of course, eliminated. In the control system the first to intermediate first shift valve 680, third to fourth shift valve 780, G-3 valve 480, first to second shuttle valve 460, direct clutch timing valve 550, overdrive gear unit valve 510, overdrive brake accumulator 530, and the overdrive gear unit manual control 578 would not be needed, and therefore, the related lines could be sealed.

Another modification would retain the overdrive gear unit 52 but omit the intermediate first and intermediate second speed ratios. Consequently, the first to intermediate first shift valve 680, the G-3 valve 780, the first to second shuttle valve 460 and the pressure switch 600 could all be removed from the control system. The first, second and third speed ratios would be retained along with the preceding described provision for either an automatic or manual upshift to the fourth or overdrive speed ratio. As has been explained, the automatic fourth speed aspect requires that the overdrive gear unit manual control 578 be set with the switch 598 in the overdrive position blocking the supply of pressure fluid via line 592 to the right end of the overdrive gear unit valve 510. When the third to fourth shift valve 780 upshifts pressure fluid will be transferred, by line 920 to the left end of the overdrive gear unit valve 510 and, as a result, the overdrive brake 62 will be engaged. If the switch 598 is in the direct drive position, then fourth speed cannot be obtained until moved to the overdrive position, even though the third to fourth shift valve 780 has upshifted, since the pressure fluid in the line 592 along with spring 512 will offer a greater force than the pressure fluid in the line 920 and thus maintain the overdrive gear unit valve 510 in the downshifted position shown.

In summary then, three possible versions of the transmission are described, although there are many more, namely, a six-speed transmission, a three-speed transmission and a fourth-speed transmission. All shifts can be made automatically and each transmission has three ranges of Forward Drive operation. Moreover, detent forced and part throttle downshifts are available for maximum performance with each transmission.

The invention is to be limited only by the following claims.

We claim:

1. In an engine driven transmission, the combination of plural drive trains for establishing different drive ratios through the transmission, each train including a fluid operated drive establishing device for rendering the respective drive train effective, a source of pressure fluid for operating the devices including a pump driven at a speed proportional to that of the engine, one of the devices becoming operative and another of the devices inoperative during a drive ratio change, and valve means for correlating the relief of fluid pressure from said one device with the supply of pressure fluid to said another device so that the engine speeds up temporarily during the ratio change thereby increasing the pump output and accordingly the rate of pressure fluid supply to said another device for completion of the ratio change.

2. In an engine driven transmission, the combination of plural drive trains for establishing different drive ratios through the transmission, each train including a fluid operated drive establishing device for rendering the respective drive train effective, a source of pressure fluid for operating the devices including a pump driven at a speed proportional to that of the engine, one of the devices becoming operative and another of the devices inoperative during a drive ratio change, and relief valve means effective during the drive ratio change to correlate the exhaust of pressure fluid from said one device with the supply of pressure fluid to said another device, the valve means causing the drive ratio change to take place initially at a slow rate with said one device remaining partially operative to transmit torque so that the engine speeds up temporarily and finally at a fast rate during which pump output is increased by the engine speed-up thereby increasing the pressure fluid supply to said other device while said one device is relieved rapidly.

3. In an engine driven transmission, the combination of plural drive trains for establishing different drive ratios through the transmission, each train including a fluid operated drive establishing device for rendering the respective drive trains effective, a source of pressure fluid for operating the devices, one of the devices becoming inoperative and another of the devices operative during a drive ratio change, and relief valve means effective during the drive ratio change, and relief valve means effective during the drive ratio change to regulate the pressure in said one device so as to control the exhaust thereof in accordance with both engine torque load and the pressure in said another device, the relief valve means upon attainment of a predetermined relationship between engine torque load and the pressure in said another device causing the pressure fluid supply to said another device to be at a faster rate.

4. In an engine driven transmission, the combination of plural drive trains for establishing different drive ratios through the transmission, each train including a fluid operated drive establishing device for rendering the respective drive trains effective, a source of pressure fluid for operating the devices, one of the devices becoming inoperative and another of the devices operative during a drive ratio change, and supply valve means for supplying pressure fluid to said another device at one rate initially and then at a faster rate when the pressure in said another device attains a certain value.

5. In an engine driven transmission, means providing plural drive trains for establishing different drive ratios through the transmission, each train including a fluid operated drive establishing device for assisting in rendering the respective drive trains effective, a source of pressure fluid for operating the devices, one of the devices becoming inoperative and another of the devices operative during a drive ratio change, relief valve means effective during the drive ratio change to regulate the pressure in said one device so as to control the exhaust thereof in accordance with both engine torque load and the pressure in said another device, and supply valve means for supplying pressure fluid to said another device at one rate initially and then at a faster rate when the pressure in said another device attains a certain value.

6. In an engine driven transmission, the combination of plural drive trains for establishing different drive ratios through the transmission, each train including a fluid operated drive establishing device for rendering the respective drive trains effective, a source of pressure fluid for operating the devices, shift valve means operative to cause one device to become inoperative and the other device operative so as to produce a drive ratio change through the transmission, the shift valve means when operative interrupting the pressure fluid supply from the source to one device while initiating pressure fluid supply from the source to the other device, and relief valve means effective during the drive ratio change to regulate the pressure in said one device so as to control the exhaust thereof in accordance with engine torque load.

7. In an engine driven transmission, means providing plural drive trains for establishing different drive ratios through the transmission, each train including a fluid operated drive establishing device for assisting in rendering the respective drive trains effective, a source of pressure fluid for operating the devices, shift valve means operative to cause one device to become inoperative and the other device operative so as to produce a drive ratio change through the transmission, the shift valve means when operative interrupting the pressure fluid supply from the source to one device while initiating pressure fluid supply from the source to the other device, and relief valve means effective during the drive ratio change to regulate the pressure in said one device so as to control the exhaust thereof in accordance with both engine torque load and the pressure in said another device.

8. In an engine driven transmission, means providing plural drive trains for establishing different drive ratios through the transmission, each train including a fluid operated drive establishing device for assisting in rendering the respective drive trains effective, a source of pressure fluid for operating the devices, shift valve means operative to cause one device to become inoperative and the other device operative so as to produce a drive ratio change through the transmission, the shift valve means when operative interrupting the pressure fluid supply from the source to one device while initiating pressure fluid supply from the source to the other device, relief valve means effective during the drive ratio change to regulate the pressure in said one device so as to control the exhaust thereof in accordance with both engine torque load and the pressure in said another device, and supply valve means for supplying pressure to said another device at one rate initially and then at a faster rate when the pressure in said another device attains a certain value.

9. In an engine driven transmission, means providing plural drive trains for establishing different drive ratios through the transmission, a fluid operated drive establishing device for rendering one of the drive trains effective, a fluid coupling for assisting in rendering another of the drive trains effective, a source of pressure fluid, shift valve means operative to cause the fluid operated device to become inoperative and the fluid coupling operative so as to produce a drive ratio change through the transmission, the shift valve means when operative interrupting the pressure fluid supply from the source to the fluid operated device while initiating pressure fluid supply from the source to the fluid coupling, relief valve means effective during the drive ratio change to regulate the pressure in the fluid operated device so as to control the exhaust thereof in accordance with both engine torque load and the pressure in the fluid coupling, and supply valve means for supplying pressure fluid to the fluid coupling at one rate initially and then at a faster rate when the pressure in the fluid operated device attains a certain value.

10. In an engine driven transmission, means providing plural drive trains for establishing different drive ratios through the transmission, each train including a fluid operated drive establishing device for assisting in rendering the respective drive trains effective, a source of pressure fluid for operating the devices, one of the devices becoming inoperative and another of the devices operative during a drive ratio change, relief valve means effective during the drive ratio change to regulate the pressure in said one device so as to control the exhaust thereof in accordance with both engine torque load and the pressure in said another device, and supply valve means including a first supply valve for furnishing pressure fluid from the source to said another device at one rate and a second supply valve effective when the pressure in said one device decreases to a predetermined value upon attainment of a certain relationship between engine torque load and the pressure in said another device to supplement the first supply valve and supply said another device from the source at a faster rate.

11. In an engine driven transmission, means providing plural drive trains for establishing drive ratios through the transmission, each train including a fluid operated drive establishing device for assisting in rendering the respective drive trains effective, a source of pressure fluid for operating the devices, shift valve means operative to cause one device to become inoperative and the other device operative so as to produce a drive ratio change through the transmission, the shift valve means when operative interrupting the pressure fluid supply from the source to one device while initiating pressure fluid supply from the source to the other device, relief valve means effective during the drive ratio change to regulate the pressure in said one device so as to control the exhaust thereof in accordance with both the engine torque load and the pressure in said another device, and supply valve means including a first supply valve for furnishing pressure fluid from the source to said another device at one rate and a second supply valve exposed to the pressure in said one device, the second supply valve being arranged to establish communication between said another device and the source when the pressure in said one device decreases to a predetermined value so as to supplement the first supply valve and furnish pressure fluid to said another device at a faster rate.

12. In an engine driven transmission, means providing plural drive trains for establishing drive ratios through the transmission, each train including a fluid operated drive establishing device for assisting in rendering the respective drive trains effective, a source of pressure fluid for operating the devices, one of the devices becoming inoperative and another of the devices operative during a drive ratio change, relief valve means effective during the drive ratio change to regulate the pressure in said one device so as to control the exhaust thereof in accordance with both the engine torque load and the pressure in said another device, supply valve means including a first supply valve for furnishing pressure fluid from the source to said another device at one rate and a second supply valve exposed to the pressure in said one device, the second supply valve being arranged to establish communication between said another device and the source when the pressure in said one device decreases to a predetermined value so as to supplement the first supply valve and furnish pressure fluid to said another device at a faster rate, and pump means operative for an interval that varies with the engine torque load to supply pressure fluid to the relief valve means so as to enable the relief valve means to regulate for said interval.

13. In an engine driven transmission, means providing plural drive trains for establishing drive ratios through the transmission, each train including a fluid operated drive establishing device for assisting in rendering the respective drive trains effective, a source of pressure fluid for operating the devices, shift valve means operative to cause one device to become inoperative and the other device operative so as to produce a drive ratio change through the transmission, the shift valve means when operative interrupting the pressure fluid supply from the source to one device while initiating pressure fluid supply from the source to the other device, relief valve means effective during the drive ratio change to regulate the pressure in said one device so as to control the exhaust thereof in accordance with both the engine torque load and the pressure in said another device, supply valve means including a first supply valve for furnishing pressure fluid from the source to said another device at one rate and a second supply valve exposed to the pressure in said one device, the second supply valve being arranged to establish communication between said another device and the source when the pressure in said one device decreases to a predetermined value so as to supplement the first supply valve and furnish pressure fluid to said another device at a faster rate, and an accumulator for supplying pressure fluid to the relief valve means so as to enable the relief valve means to regulate the accumulator capacity and accordingly the volume of pressure fluid available for enabling the relief valve means to regulate varying with the engine torque load.

14. In an engine driven transmission, means providing plural drive trains for establishing drive ratios through the transmission, a fluid operated drive establishing device for assisting in rendering one of the drive trains effective, a fluid coupling for rendering another of the drive trains effective, a source of pressure fluid, shift valve means operative to cause the fluid operated device to become inoperative and the fluid coupling operative so as to produce a drive ratio change through the transmission, the shift valve means when operative interrupting the pressure fluid supply from the source to the fluid operated device while initiating pressure fluid supply from the source to the fluid coupling, relief valve means effective during the drive ratio change to regulate the pressure in the fluid operated device so as to control the exhaust thereof in accordance with both the engine torque load and the pressure in the fluid coupling and supply valve means including a first supply valve for furnishing pressure fluid from the source to the fluid coupling at one rate and a second supply valve effective when the pressure in the fluid operated device decreases to a predetermined value upon attainment of a certain relationship between engine torque load and the pressure in the fluid coupling to supplement the first supply valve and furnish pressure fluid to the fluid coupling from the source at a faster rate.

15. In an engine driven transmission, means providing plural drive trains for establishing drive ratios through the transmission, a fluid operated drive establishing device for rendering one of the drive trains effective, a fluid coupling for assisting in rendering another of the drive trains effective, a source of pressure fluid, shift valve means operative to cause the fluid operated device to become inoperative and the fluid coupling operative so as to produce a drive ratio change through the transmission, the shift valve means when operative interrupting the pressure fluid supply from the source to the fluid operated device while initiating pressure fluid supply from the source to the fluid coupling, relief valve means effective during the drive ratio change to regulate the pressure in the fluid operated device so as to control the exhaust thereof in accordance with both the engine torque load and the pressure in the fluid coupling, supply valve means including a first supply valve for furnishing pressure fluid from the source to the fluid coupling at one rate and a second supply valve exposed to the pressure in the fluid operated device, the second supply valve being arranged to establish communication between the fluid coupling and the source when the pressure in the fluid operated device decreases to a predetermined value so as to supplement the first supply valve and furnish pressure fluid to the fluid coupling at a faster rate, and an accumulator for supplying pressure fluid to the relief valve means so as to enable the relief valve means to regulate the accumulator capacity and accordingly the volume of pressure fluid available for enabling the relief valve means to regulate varying with the engine torque load.

16. In an engine driven transmission, the combination of gearing, fluid operated devices for so conditioning the gearing as to establish a plurality of drive ratios, a relay valve positionable in a series of settings for causing the devices to establish corresponding drive ratios, and an electrically operated control device including a pressure switch for rendering the electrically operated device effective, the pressure switch being actuated upon attainment of a predetermined drive ratio so as to enable the electrically operated device to position the relay valve in one of the series of settings.

17. In an engine driven transmission, the combination of gearing, fluid operated devices for so conditioning the gearing as to establish a plurality of drive ratios, a relay valve positionable in a series of settings for causing the devices to establish corresponding drive ratios, a shift valve train effective to position the relay valve in one setting and an electrically operated control device including a pressure switch for rendering the electrically operated device effective, the pressure switch being actuated upon attainment of a predetermined drive ratio so as to enable the electrically operated device to position the relay valve in another setting.

18. In an engine driven transmission, the combination of gearing, fluid operated devices for so conditioning the gearing as to establish a plurality of drive ratios, a relay valve positionable in a series of settings for causing the devices to establish corresponding drive ratios, a control device including a valve element, an electric relay for actuating the valve element, a source of voltage, an electric circuit extending between the electric relay and the voltage source, the circuit having a manually controlled switch and a pressure switch, means for closing the pressure switch, both switches when closed completing the circuit so as to energize the electric relay, the electric relay when energized causing the valve element to position the relay valve in one of the settings.

19. In an engine driven transmission, the combination of gearing, fluid operated devices for so conditioning the gearing as to establish a plurality of drive ratios, a relay valve positionable in a series of settings for causing the devices to establish corresponding drive ratios, a control device including a valve element, an electric relay for actuating the valve element, a source of voltage, an electric circuit extending between the electric relay and the voltage source, the circuit having a manually controlled switch and a pressure switch, means effective upon attainment of a predetermined drive ratio for closing the pressure switch, both switches when closed completing the circuit so as to energize the electric relay, the electric relay when energized causing the valve element to position the relay valve in one of the settings.

20. In an engine driven transmission, the combination of gearing, fluid operated devices for so conditioning the gearing so as to establish a plurality of drive ratios, a plurality of shift valve trains, a relay valve positionable in a series of settings for causing the devices to establish corresponding drive ratios, one of the shift valve trains being effective to establish one setting of the relay valve, a control device including a valve element, an electric relay for actuating the valve element, a source of voltage, an electric circuit extending between the electric relay and the voltage source, the circuit having a manually controlled switch and a pressure switch, another of the shift valve trains being effective upon attainment of a predetermined drive ratio to close the pressure switch, both switches when closed completing the circuit so as to energize the electric relay, the electric relay when energized causing the valve element to position the relay valve in another setting.

21. In an engine driven transmission, the combination of gearing, fluid operated devices for so conditioning the gearing so as to establish a plurality of drive ratios, a relay valve positionable in a series of settings for causing the devices to establish corresponding drive ratios, and timing valve means effective when the relay valve is in one of the series of settings to coordinate the establishment of the corresponding drive ratio with engine torque load so that the delay in establishment thereof increases with an increase in the engine torque load.

22. In an engine driven transmission, the combination of gearing, fluid operated devices for so conditioning the gearing as to establish a plurality of drive ratios, a relay valve positionable in a series of settings for causing the devices to establish corresponding drive ratios, means for positioning the relay valve in different ones of the series of settings including a shift valve train, and timing valve means effective when the relay valve is one of the series of settings to coordinate the establishment of the corresponding drive ratio with engine torque load so that the delay in establishment thereof increases with an increase in the engine torque load.

23. In an engine driven transmission, the combination of gearing, fluid operated devices for so conditioning the gearing as to establish a plurality of drive ratios, a relay valve positionable in a series of settings for causing the devices to establish corresponding drive ratios, timing valve means effective when the relay valve is in one of the series of settings to coordinate the establishment of the corresponding drive ratio with engine torque load so that the delay in establishment thereof increases with an increase in the engine torque load, and accumulator means effective when the relay valve is in another of the series of settings to control the establishment of the corresponding drive ratio in accordance with engine torque load so that the delay in establishment thereof decreases with an increase in the engine torque load.

24. In an engine driven transmission, the combination of gearing, fluid operated devices for so conditioning the gearing as to establish a plurality of drive ratios, a relay valve positionable in a series of settings for causing the devices to establish corresponding drive ratios, means for positioning the relay valve in different ones of the series of settings including a shift valve train and a manual control device, timing valve means effective when the relay is in one of the series of settings to coordinate the establishment of the corresponding drive ratio with engine torque load so that the delay in establishment thereof increases with an increase in the engine torque load, and accumulator means effective when the relay valve is in another of the series of settings to control the establishment of the corresponding drive ratio in accordance with engine torque load so that the delay in establishment thereof decreases with an increase in the engine torque load.

25. In an engine driven transmission, the combination of gearing, fluid operated devices for so conditioning the gearing as to establish a plurality of drive ratios, a relay valve positionable in a series of settings for causing the devices to establish corresponding drive ratios, means for positioning the relay valve in different ones of the series of settings, timing valve means effective when the relay valve is in one of the series of settings to coordinate the establishment of the corresponding drive ratio with engine torque load so that the delay in establishment thereof increases with an increase in the engine torque load, and accumulator means effective when the relay valve is in another of the series of settings to control the establishment of the corresponding drive ratio in accordance with engine torque load so that the delay in establishment thereof decreases with an increase in the engine torque load.

26. In an engine driven transmission, the combination of gearing, fluid operated devices for so conditioning the gearing as to establish a plurality of drive ratios, a relay valve positionable in a series of settings for causing the devices to establish corresponding drive ratios, a plurality of shift valve trains, one of the shift valve trains being effective to position the relay valve in one of the series of settings, biasing means for positioning the relay valve in another of the series of settings, timing valve means effective when the relay valve is positioned in said another setting to coordinate the establishment of the corresponding drive ratio with engine torque load so that the delay in establishment thereof increases with an increase in engine torque load, and accumulator means effective when the relay valve is positioned in said one setting to control the establishment of the corresponding drive ratio in accordance with engine torque load so that the delay in establishment thereof decreases with an increase in engine torque load.

27. In an engine driven transmission, the combination of gearing, fluid operated devices for so conditioning the gearing as to establish a plurality of drive ratios, a relay valve positionable in a series of settings for causing the devices to establish corresponding drive ratios, a control device including a valve element, an electric relay for actuating the valve element, a source of voltage, an electric circuit extending between the electric relay and the voltage source, the circuit having a manually controlled switch and a pressure switch, means effective upon attainment of a predetermined drive ratio for closing the pressure switch, both switches when closed completing the circuit so as to energize the electric relay, the electric relay when energized causing the valve element to move the relay valve from one setting to another, timing valve means effective when the relay valve is positioned in said another setting to coordinate the establishment of the corresponding drive ratio with engine torque load so that the delay in establishment thereof increases with an increase in engine torque load, and accumulator means effective when the relay valve is positioned in said one setting to control the establishment of the corresponding drive ratio in accordance with engine torque load so that the delay in establishment thereof decreases with an increase in engine torque load.

28. In an engine driven transmission, the combination of gearing, fluid operated devices for so conditioning the gearing as to establish a plurality of drive ratios, a relay valve positionable in a series of settings for causing the devices to establish corresponding drive ratios, a plurality of shift valve trains, one of the shift valve trains being effective to position the relay valve in one of the series of settings, a control device including a valve element, an electric relay for actuating the valve element, a source of voltage, an electric circuit extending between the electric relay and the voltage source, the circuit having a manually controlled switch and a pressure switch, another of the shift valve trains being effective upon attainment of a predetermined drive ratio to close the pressure switch, both switches when closed completing the circuit so as to energize the electric relay, the electric relay when energized causing the valve element to position the relay valve in another of the series of settings, timing valve means effective when the relay valve is positioned in said another setting to coordinate the establishment of the corresponding drive ratio with engine torque load so that the delay in establishment thereof increases with an increase in engine torque load, and accumulator means effective when the relay valve is positioned in said one setting to control the establishment of the corresponding drive ratio in accordance with engine torque load so that the delay in establishment thereof decreases with an increase in engine torque load.

29. In an engine driven transmission, the combination of gearing, fluid operated devices for so conditioning the gearing as to establish a plurality of drive ratios, a source of pressure fluid, a plurality of shift valve trains, a relay valve positionable in a series of settings for connecting different ones of the fluid operated devices to the source of pressure fluid, a shuttle valve operative to connect different ones of the plurality of shift valve trains to the relay valve so as to position the relay valve in one of the series of settings, means operative in accordance with the drive ratio in effect to determine the shift valve train to be connected by the shuttle valve to the relay valve, and means for positioning the relay valve in another of the series of settings.

30. In an engine driven transmission, the combination of gearing, fluid operated devices for so conditioning the gearing as to establish a plurality of drive ratios, a source of pressure fluid, a plurality of shift valve trains, a relay valve positionable in a series of settings for connecting different ones of the fluid operated devices to the source of pressure fluid, a shuttle valve operative to connect different ones of the plurality of shift valve trains to the relay valve so as to position the relay valve in one of the series of settings, means operative in accordance with the drive ratio in effect to determine the shift valve train to be connected by the shuttle valve to the relay valve, means for positioning the relay valve in another of the series of settings, and timing valve means effective when the relay valve is positioned in said another of the series of settings to coordinate the establishment of the corresponding drive ratio with engine torque load so that the delay in establishment thereof increases with an increase of the engine torque load.

31. In an engine driven transmission, the combination of gearing, fluid operated devices for so conditioning the gearing as to establish a plurality of drive ratios, a source of pressure fluid, a plurality of shift valve trains, a relay valve positionable in a series of settings for connecting different ones of the fluid operated devices to the source of pressure fluid, a shuttle valve operative to connect different ones of the plurality of shift valve trains to the relay valve so as to position the relay valve in one of the series of settings, a manual control device operative to position the relay valve in another of the series of settings, timing valve means effective when the relay valve is positioned in said another of the series of settings to coordinate the establishment of the corresponding drive ratio with engine torque load so that the delay in establishment thereof increases with an increase of the engine torque load, and an accumulator means effective when the relay valve is positioned in said one of the series of settings to control the establishment of the corresponding drive ratio in accordance with engine torque load so that the delay in establishment thereof decreases with an increase in engine torque load.

32. In an engine driven transmission, the combination of gearing, fluid operated devices for so conditioning the gearing as to establish a plurality of drive ratios, a source of pressure fluid, a plurality of shift valve trains, a relay valve positionable in a series of settings for connecting different ones of the fluid operated devices to the source of pressure fluid, a shuttle valve operative to connect different ones of the plurality of shift valve trains to the relay valve so as to position the relay valve in one of the series of settings, means operative in accordance with the drive ratio in effect to determine the shift valve train to be connected by the shuttle valve to the relay valve, means for positioning the relay valve in another of the series of settings, timing valve means effective when the relay valve is positioned in said another of the series of settings to coordinate the establishment of the corresponding drive ratio with engine torque load so that the delay in establishment thereof increases with an increase of the engine torque load, and an accumulator means effective when the relay valve is positioned in said one of the series of settings to control the establishment of the corresponding drive ratio in accordance with engine torque load so that the delay in establishment thereof decreases with an increase in engine torque load.

33. In an engine driven transmission, the combination of gearing, fluid operated devices for so conditioning the gearing as to establish a plurality of drive ratios, a source of pressure fluid, a plurality of shift valve trains, a relay valve positionable in a series of settings for connecting different ones of the fluid operated devices to the source of pressure fluid, a shuttle valve operative to connect different ones of the plurality of shift valve trains to the relay valve so as to position the relay valve in one of the series of settings, signal valve means operative in accordance with the drive ratio in effect to determine the shift valve train to be connected by the shuttle valve to the relay valve, a manual control device operative to position the relay valve in another of the series of settings, timing valve means effective when the relay valve is positioned in said another of the series of settings to coordinate the establishment of the corresponding drive ratio with engine torque load so that the delay in establishment thereof increases with an increase in engine torque load, and an accumulator means effective when the relay valve is positioned in said one of the series of settings to control the establishment of the corresponding drive ratio in accordance with engine torque load so that the delay in establishment thereof decreases with an increase in engine torque load.

34. In an engine driven transmission, the combination of gearing, fluid operated devices for so conditioning the gearing as to establish a plurality of drive ratios, a source of pressure fluid, a plurality of shift valve trains, a relay valve positionable in a series of settings for connecting different ones of the fluid operated devices to the source of pressure fluid, a shuttle valve operative to connect different ones of the plurality of shift valve trains to the relay valve so as to position the relay valve in one of the series of settings, signal valve means operative in accordance with the drive ratio in effect to determine the shift valve train to be connected by the shuttle valve to the relay valve, a control device including a valve element, an electric relay for actuating the valve element, a source of voltage, an electric circuit extending between the electric relay and the voltage source, the circuit having a manually controlled switch and a pressure switch, pressure means for closing the pressure switch upon attainment of a predetermined drive ratio, both switches when closed completing the circuit so as to energize the electric relay, the electric relay when energized causing the valve element to position the relay valve in another of the series of settings, timing valve means effective when the relay valve is positioned in said another of the series of settings to coordinate the establishment of the corresponding drive ratio with engine torque load so that the delay in establishment thereof increases with an increase of the engine torque load, and an accumulator means effective when the relay valve is positioned in said one of the series of settings to control the establishment of the corresponding drive ratio in accordance with engine torque load so that the delay in establishment thereof decreases with an increase in engine torque load.

35. A transmission having plural forward drive ranges, the combination of gearing, fluid operated devices for so conditioning the gearing as to provide a plurality of drive ratios through the transmission, a source of pressure fluid for operating the devices, one of the devices being operative only in one of the drive ranges so as to establish an overrun braking connection through the transmission during coast, and means for reducing the fluid pressure supplied to said one of the devices.

36. In a transmission having plural forward drive ranges, the combination of gearing, fluid operated devices for so conditioning the gearing as to provide a plurality of drive ratios through the transmission, a source of pressure fluid for operating the devices, a shift valve train movable to an upshifted position from a downshifted position for causing said devices to establish a higher drive ratio, the shift valve train in the upshifted position connecting one of the fluid operated devices to the source so as to establish an overrun braking connection through the transmission in one of the drive ranges, and valve means for reducing the fluid pressure supplied to said one of the devices.

37. In a transmission having plural forward drive ranges, the combination of a series of planetary gear units for providing a plurality of forward drive ratios through the transmission, a source of fluid pressure, brake means including a one-way device for preventing rotation of an element of one of the gear units so as to provide reaction therefor, fluid operated overrun brake means for preventing rotation of the reaction element in either direction so as to afford an overrun braking connection through the transmission in one of the drive ranges, and valve means for reducing the fluid pressure supplied to the overrun brake means.

38. In a transmission, the combination of a series of planetary gear units for providing a plurality of forward drive ratios, a source of fluid pressure, a manually operated selector valve for controlling the distribution of fluid pressure from the source, the selector valve having plural positions for establishing different drive ranges, brake means including a one-way device for preventing rotation of an element of one of the gear units so as to provide reaction therefor, fluid operated overrun brake means operative to prevent rotation of the reaction element in either direction so as to afford an overrun braking connection through the transmission when the selector valve is in one of the plural positions, a shift valve train movable to an upshifted position to establish a higher speed drive ratio, the shift valve train in the upshifted position supplying pressure fluid to the overrun brake means thereby rendering the overrun brake means operative, and valve means for reducing the fluid pressure supplied to the fluid operated overrun brake means.

References Cited by the Examiner

UNITED STATES PATENTS

| | | | |
|---|---|---|---|
| 1,997,682 | 4/35 | Emery | 192—28 |
| 2,516,208 | 7/50 | Hasbany | 74—754 |
| 2,616,310 | 11/52 | Jandasek | 74—688 |
| 2,675,102 | 4/54 | Robinson | 192—.07 |
| 2,699,074 | 1/55 | Livezely et al. | 74—645 |
| 2,753,732 | 7/56 | Harrison | 74—472 |
| 2,763,162 | 9/56 | Herndon | 74—645 |
| 2,788,678 | 4/57 | Sheppard | 74—645 |
| 2,794,349 | 6/57 | Smirl | 74—752 |
| 2,829,542 | 4/58 | Swennes | 74—688 |
| 2,832,231 | 4/58 | Edsall | 74—472 |

DON A. WAITE, *Primary Examiner.*

SAMUEL SPINTMAN, BROUGHTON G. DURHAM, *Examiners.*